(12) United States Patent
Cohen

(10) Patent No.: US 11,725,805 B2
(45) Date of Patent: Aug. 15, 2023

(54) LIGHTING JUNCTION BOX WITH ASSEMBLY FOR HANGING

(71) Applicant: Brandon Cohen, Vernon, CA (US)

(72) Inventor: Brandon Cohen, Vernon, CA (US)

(73) Assignee: AMP Plus, Inc., Vernon, CA (US)

( * ) Notice: Subject to any disclaimer, the term of this patent is extended or adjusted under 35 U.S.C. 154(b) by 414 days.

(21) Appl. No.: 17/106,048

(22) Filed: Nov. 27, 2020

(65) Prior Publication Data
US 2021/0080081 A1 Mar. 18, 2021

Related U.S. Application Data

(63) Continuation-in-part of application No. 16/417,546, filed on May 20, 2019, now Pat. No. 10,876,721.

(51) Int. Cl.
| | |
|---|---|
| H02G 3/08 | (2006.01) |
| F21V 15/01 | (2006.01) |
| F21V 21/34 | (2006.01) |
| F21V 23/06 | (2006.01) |
| H02G 3/12 | (2006.01) |

(52) U.S. Cl.
CPC .............. *F21V 15/01* (2013.01); *F21V 21/34* (2013.01); *F21V 23/06* (2013.01); *H02G 3/08* (2013.01); *H02G 3/086* (2013.01); *H02G 3/12* (2013.01)

(58) Field of Classification Search
CPC .......... H02G 3/08; H02G 3/081; H02G 3/083; H02G 3/12; H02G 3/121; H02G 3/123; H02G 3/125; H02G 3/126; H02G 3/10; H05K 5/00; H05K 5/02; H05K 5/0204; H05K 5/0217; F21V 21/04; F21V 21/042; F21V 21/048

USPC ....... 174/480, 481, 50, 53, 57, 58, 535, 542, 174/560, 559, 54, 61, 63; 220/3.2–3.9, 220/4.02; 248/906, 343, 317, 342
See application file for complete search history.

(56) References Cited

U.S. PATENT DOCUMENTS

| | | |
|---|---|---|
| 1,133,535 A | 3/1915 | Cain |
| 1,471,340 A | 10/1923 | Knight |
| 1,856,356 A | 5/1932 | Owen |
| 2,352,913 A | 7/1944 | Parker |
| 2,758,810 A | 8/1956 | Good |
| 2,802,933 A | 8/1957 | Broadwin |
| 3,104,087 A | 9/1963 | Budnick |
| 3,773,968 A | 11/1973 | Copp |

(Continued)

*Primary Examiner* — Angel R Estrada
(74) *Attorney, Agent, or Firm* — Eric Kelly

(57) ABSTRACT

A lighting-junction-box may have sidewalls that bound a cavity. The cavity may be configured to receive an electronic component that is configured to emit light. The sidewalls may be divided into an upper-portion and a lower-portion. The lower-portion may be substantially cylindrical in shape. The upper-portion may be substantially octagonal in shape, except that two of the eight faces may be curved, while the remaining six faces may be flat and planar. The two curved faces may be oppositely disposed from each other. The two curved faces may have holes for receiving carriage-bolts for attaching adjusting-plates to the lighting-junction-box. Below the holes of the two curved faces on the lower-portion may be external-length-gauges to assist with mounting the lighting-junction-box. The adjusting-plates may have slots for receiving the carriage-bolts and to allow for vertical adjustment of the lighting-junction-box with respect to the adjusting-plates.

20 Claims, 19 Drawing Sheets

(56) References Cited

U.S. PATENT DOCUMENTS

| | | |
|---|---|---|
| 3,913,773 A | 10/1975 | Copp |
| 4,880,128 A | 11/1989 | Jorgensen |
| 4,919,292 A | 4/1990 | Hsu |
| 5,303,894 A | 4/1994 | Deschamps |
| 5,420,376 A | 5/1995 | Rajecki |
| 5,957,573 A | 9/1999 | Wedekind |
| 6,521,833 B1 | 2/2003 | DeFreitas |
| 6,967,284 B1 | 11/2005 | Gretz |
| 7,784,754 B2 | 8/2010 | Nevers |
| 7,857,275 B2 | 12/2010 | de la Borbolla |
| 7,950,832 B2 | 5/2011 | Tanaka |
| 8,235,549 B2 | 8/2012 | Gingrich, III |
| 8,926,133 B2 | 1/2015 | Booth |
| 9,151,457 B2 | 10/2015 | Pickard |
| 9,605,842 B1 | 3/2017 | Davis |
| 9,696,021 B2 | 7/2017 | Wronski |
| 9,797,562 B2 | 10/2017 | Dabiet |
| 9,964,266 B2 | 5/2018 | Danesh |
| D832,218 S | 10/2018 | Wronski |
| D833,977 S | 11/2018 | Danesh |
| 10,139,059 B2 | 11/2018 | Danesh |
| D848,375 S | 5/2019 | Danesh |
| D851,046 S | 6/2019 | Peng |
| 10,408,396 B2 | 9/2019 | Wronski |
| D864,877 S | 10/2019 | Danesh |
| 10,876,721 B1 * | 12/2020 | Cohen .................... H02G 3/125 |
| 11,159,004 B2 * | 10/2021 | Cohen .................... H02G 3/125 |
| 11,255,497 B2 * | 2/2022 | Danesh ................ H02G 3/20 |
| 11,342,733 B2 * | 5/2022 | Oh .......................... H02G 3/20 |
| 2015/0233556 A1 | 8/2015 | Danesh |
| 2016/0348861 A1 | 12/2016 | Bailey |
| 2017/0138576 A1 | 5/2017 | Peng |
| 2017/0167672 A1 | 6/2017 | Stauner |
| 2017/0167699 A1 | 6/2017 | Schubert |
| 2019/0063701 A1 | 2/2019 | Lotfi |

\* cited by examiner

LIGHTING JUNCTION BOX WITH ASSEMBLY FOR HANGING

PRIORITY NOTICE

The present patent application is a continuation-in-part (CIP) of U.S. non-provisional patent application Ser. No. 16/417,546 filed on May 20, 2019, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to junction boxes and more specifically to lighting junction boxes with assemblies for attaching to hanger bars that slidingly adjustable.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

The manufacture and installation of recessed lighting is complicated by the required adherence to building codes and regulations. In the past, the combination of a recessed ceiling lighting housing—or "can"—and a separate recessed fire-rated drywall box was required when installing an overhead light fixture in order to create a space between the can and surrounding insulation. The purpose of the space is to prevent fire hazard such as in the event of an electrical failure. The can held the lighting fixture, while the surrounding drywall box provided the required space to prevent fire hazards in the event of an electrical failure. This combination was necessarily accompanied by at least one separate junction-box, separate from the can, in which through-branch wiring connections were routed for each overhead downlight connected in the circuit.

Recently, compact lighting junction-boxes have been developed that retain the combination of a fire-rated recessed lighting fixture, while also allowing the wiring connections afforded by traditionally separate junction-boxes. This combination lighting junction-box provides both the lighting housing and the electrical junction-box requirements in a single (integral) unit. Importantly, the new combination lighting junction-boxes provide fire-rated protection, without the need for the creation of a separate fire-rated drywall cavity surrounding the can that houses the lighting element and/or driver. When used in conjunction with light emitting diode (LED) lighting, in which heat production and overall lighting module size are reduced (as compared to incandescent and/or halogen lighting or the like), the new combination lighting junction-box provides a multitude of advantages over traditional downlight fixtures and circuits.

Further, because of various structural differences behind a given ceiling, lighting-junction-boxes may need to be mounted/installed at various vertical depths/distance from the given ceiling surface; and thus, there is a need for make vertical adjustments when mounting/installing recessed lighting-junction-boxes with respect to a given ceiling.

There is a need in the art for such combination lighting-junction-boxes and that have vertical adjustment means.

It is to these ends that the present invention has been developed.

BRIEF SUMMARY OF THE INVENTION

To minimize the limitations in the prior art, and to minimize other limitations that will be apparent upon reading and understanding the present specification, the present invention may describe a junction-box assembly, a lighting-junction-box, adjusting-plates, and guide-rails. The lighting-junction-box may have sidewalls that bound a cavity. The cavity may be configured to receive an electronic component that is configured to emit light. The sidewalls may be divided into an upper-portion and a lower-portion. The lower-portion may be substantially cylindrical in shape. The upper-portion may be substantially octagonal in shape, except that two of the eight faces may be curved, while the remaining six faces may be flat and planar. The two curved faces may be oppositely disposed from each other. The two curved faces may have holes for receiving carriage-bolts for attaching the adjusting-plates to the lighting-junction-box. Below the holes of the two curved faces, on the lower-portion, may be external-length-gauges to assist with mounting the lighting-junction-box. The adjusting-plates may have slots for receiving the carriage-bolts and to allow for vertical adjustment of the lighting-junction-box with respect to the adjusting-plates. The adjusting-plates may be attached to guide-rails. And the guide-rails may be attached to hanger-bars for ceiling/joist mounting and the like.

It is an objective of the present invention to provide a lighting-junction-box that is both substantially octagonal in its upper regions and cylindrical in its lower regions, as the octagonal region mimics preexisting octagonal junction boxes which facilitates how existing electrical connections are made to preexisting octagonal junction boxes; while the cylindrical region mimics lighting hardware where the lighting hardware elements (e.g., light emitters, reflectors, and/or trims) are often cylindrical and/or conical in shape.

It is another objective of the present invention to facilitate ease of installing and/or mounting the lighting-junction-box into ceilings by providing a means of vertical adjustment between the lighting-junction-box and hanger-bars.

It is yet another objective of the present invention to provide external vertical markings on the lighting-junction-box to facilitate the vertical adjustments when installing and/or mounting (often in a recessed manner with respect to a given ceiling).

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1A:
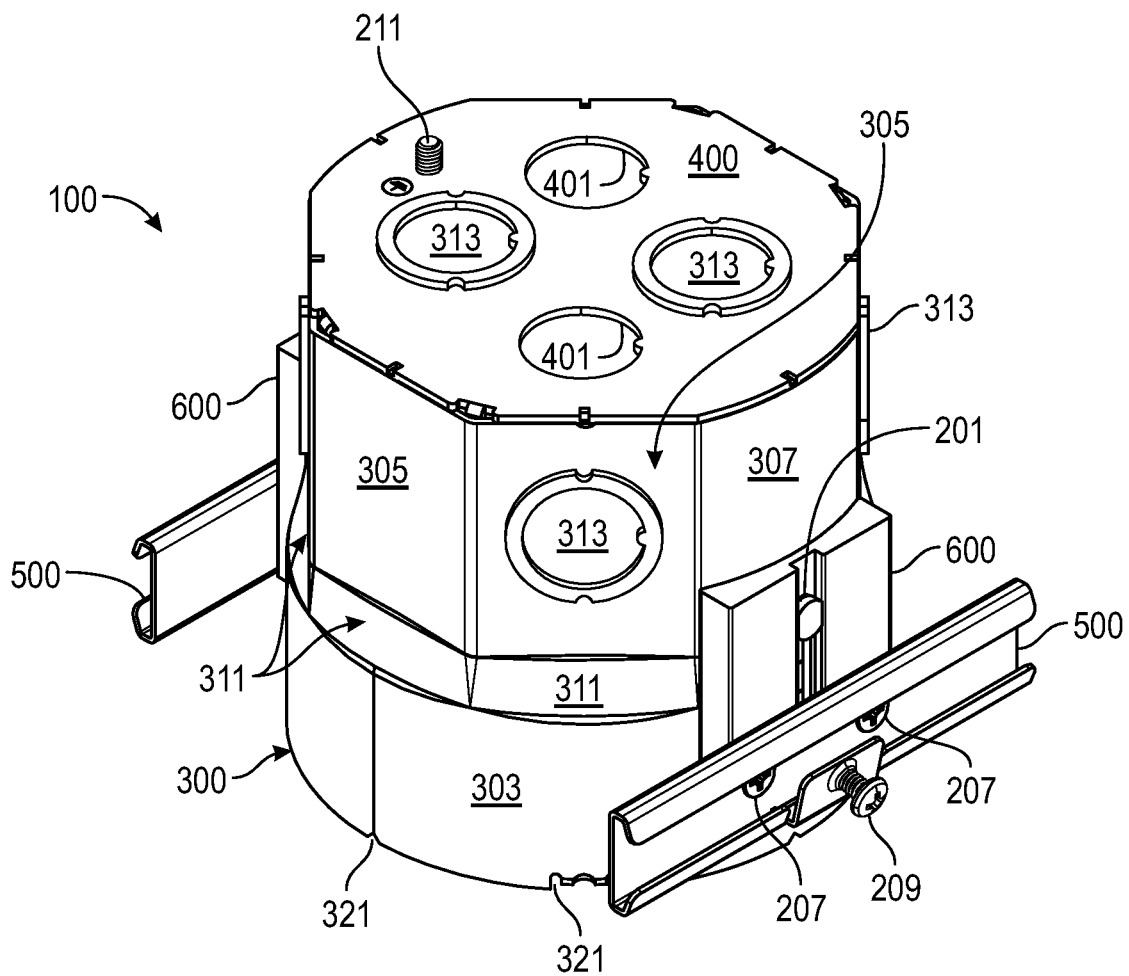
FIG. 1A may show a side and top perspective view of an assembly of a lighting junction-box attached to two adjusting-plates and wherein each adjusting-plate is attached to a guide-rail.

REFERENCE NUMERAL SCHEDULE 100 assembly 100
201 carriage-bolt 201
203 wing-nut 203
205 retainer-washer 205
207 screw 207
209 screw 209
300 junction-box 300
301 upper-portion 301
303 lower-portion 303
305 planar-face 305
307 curved-segment 307
309 hole 309
311 sloped-indentation 311
313 knock-out 313
315 top-edge 315
317 external-length-gauge 317
319 bottom-circular-edge 319
321 notch 321
323 flange 323
325 hole 325
327 cavity 327
329 angle-between-adjacent-planar-faces 329
400 lid 400
401 hole-for-conduit 401
403 hole 403
405 external-side 405
407 internal-side 407
409 peripheral-edge 409
500 guide-rail 500
501 main-elongate-portion 501
503 top-guide-rail 503
505 bottom-guide-rail 505
507 central-guide-rail 507
509 hole 509
511 hole 511
600 adjusting-plate 600
601 adjustment-slot 601
603 flat-front 603
605 channel 605
607 curved-back 607
609 hole 609

DETAILED DESCRIPTION OF THE INVENTION

The present patent application is a continuation-in-part (CIP) of U.S. non-provisional patent application Ser. No. 16/417,546 filed on May 20, 2019, and claims priority to said U.S. non-provisional patent application under 35 U.S.C. § 120. Patent application Ser. No. 16/417,546 is incorporated herein by reference in its entirety as if fully set forth below.

Note, with respect to differences between the present patent application and the parent patent application (with patent application Ser. No. 16/417,546), at least some differences may be as follows: (a) junction-box 300 (as disclosed herein) may have no slots, such as slots 128 of patent application Ser. No. 16/417,546; slots 128 of patent application Ser. No. 16/417,546 are replaced with holes 309 in the present patent application; (b) adjusting-plate 600 (as disclosed herein) may have no holes for a carriage-bolts as bracket 154 of patent application Ser. No. 16/417,546 does have; instead, adjusting-plate 600 may have an adjustment-slot 601 for the carriage-bolt; and (c) a mostly octagonal shape of top-edge 315 of junction-box 300 (as disclosed herein) may be different from the shapes of the upper portions of junction box 112 and 112' of patent application Ser. No. 16/417,546. The mostly octagonal shape of top-edge 315 of junction-box 300 (as disclosed herein) has two groups of three planar-faces 305 with each group being separated by opposing curved-segments 307, such that the mostly octagonal shape has six flat and planar sides/faces and two faces that are curved. Whereas, in junction box 112 of patent application Ser. No. 16/417,546 the pattern alternates between flat planar faces 122 and curved segments 180. And in junction box 112' of patent application Ser. No. 16/417,546 the pattern is entirely of all flat planar faces 122, with no curved segments 180. For example, compare the current FIG. 3F (showing the mostly octagonal shape of top-edge 315) against FIG. 3 of patent application Ser. No. 16/417,546 (for junction box 112) and against FIG. 11 of patent application Ser. No. 16/417,546 (for junction box 112').

Note, "lighting-junction-box" and "junction-box" may be used interchangeably with respect to junction-box 300.

Note, "vertical" "vertical direction," and/or the like as used herein may refer to a direction from a bottom-circular edge 319 of a given junction-box 300 to a top-edge 315 of that same given junction-box 300. And as such, "vertical," "vertical direction," and/or the like, may be interchangeable with an "axial direction" of that same given junction-box 300. That is, "axial direction" may run from bottom-circular edge 319 of a given junction-box 300 to top-edge 315 of that same given junction-box 300.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1B:
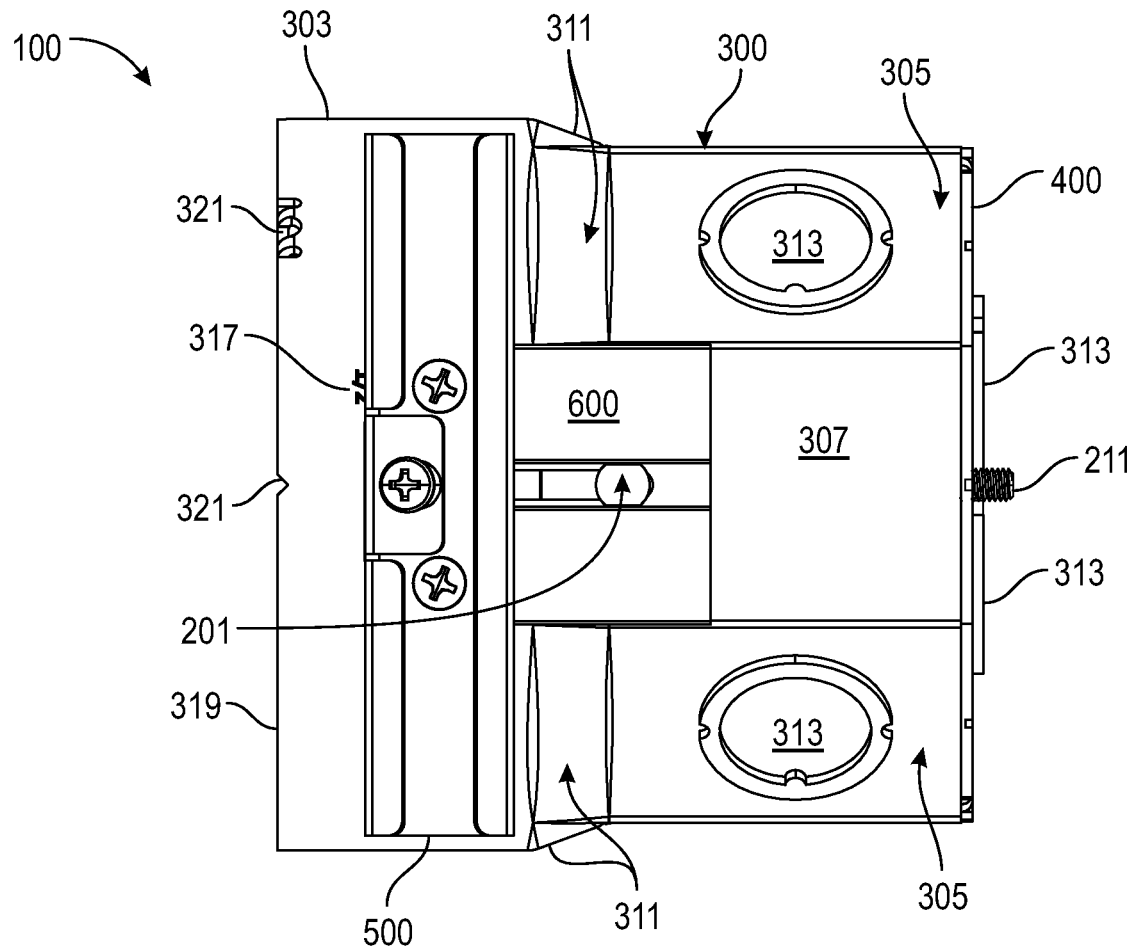
FIG. 1B may show a side view of the assembly of FIG. 1A.
Figure 1C:
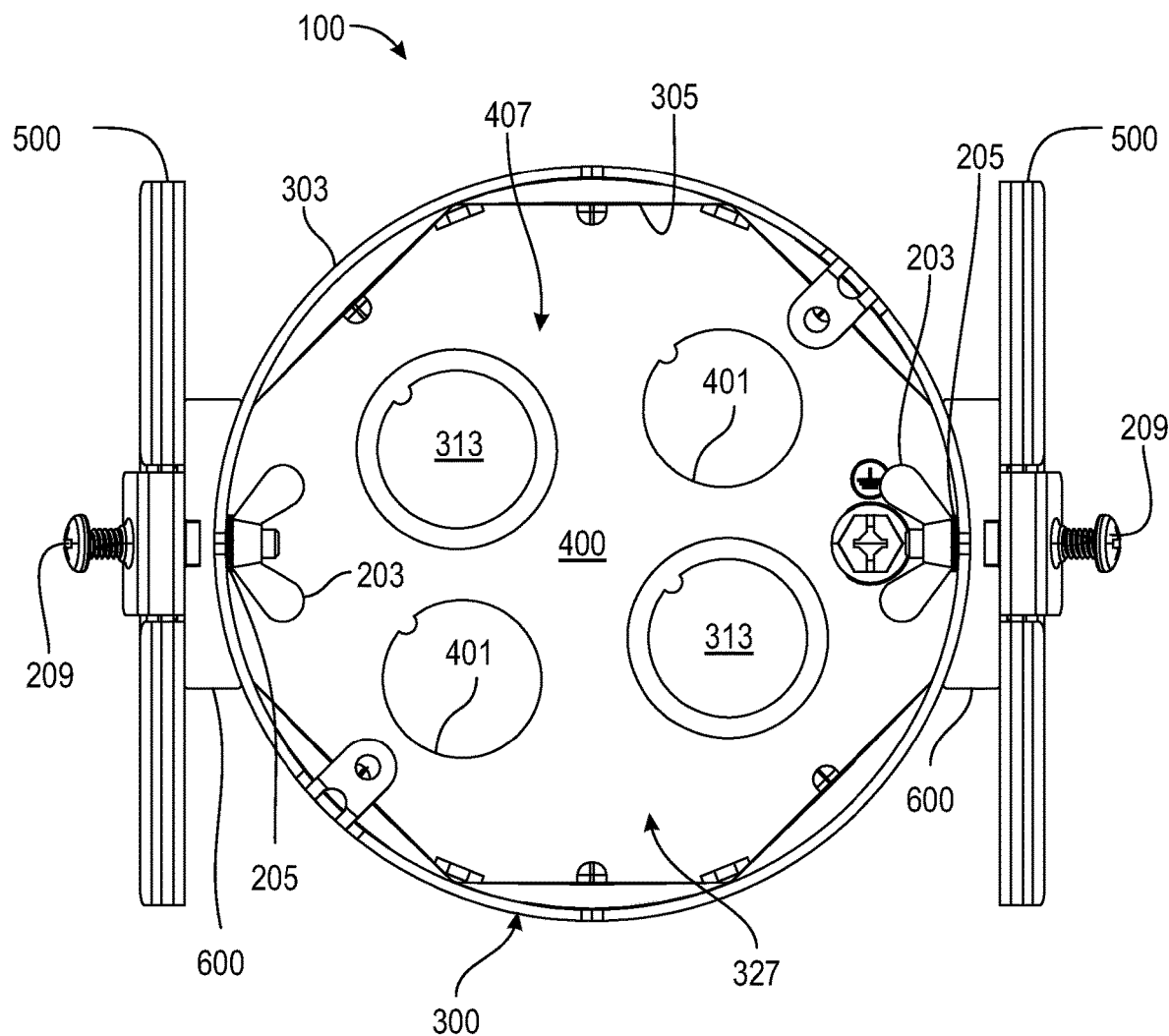
FIG. 1C may show a bottom view of the assembly of FIG. 1A.

FIG. 1A may show a side and top perspective view of an assembly 100. FIG. 1B may show a side view of assembly 100. FIG. 1C may show a bottom view of an assembly 100. In some embodiments, assembly 100 may comprise at least one junction-box 300, at least one lid 400, two guide-rails 500, and two adjusting-plates 600 (as well as some mechanical fastener means for attaching components together). In some embodiments, lid 400 may be attached to a top of junction-box 300. In some embodiments, each of the two adjusting-plates 600 may be slidingly attached to an opposing curved-segment 307 of junction-box 300. In some embodiments, each of the two guide-rails 500 may be fixedly attached to one of the adjusting-plates 600. In some embodiments of assembly 100, a length of junction-box 300 may be substantially parallel with lengths of the two adjusting-plates 600. In some embodiments of assembly 100, lengths of junction-box 300 and of the two adjusting-plates 600 may be substantially orthogonal with lengths of the two guide-rails 500.

In some embodiments, junction-box 300 may be configured to house at least a portion of one or more of: an electronic component that is configured to emit light; a light emitter (e.g., a light emitter 114 from patent application Ser. No. 16/417,546); a light module; a light module driver; electronics; circuits; wiring; cabling; conduit; electronic hardware; a switch; a printer circuit board (PCB); an integrated circuit; portions thereof; combinations thereof; and/or the like.

FIG. 1C may show cavity 327 (internal volume) of junction-box 300. In some embodiments, cavity 327 may be of a predetermined, fixed, static, and non-variable volume. In some embodiments, cavity 327 may be of 47.2 cubic inches (774 cubic centimeters). In some embodiments, cavity 327 may be of another predetermined volume.

In some embodiments, at least a portion of assembly 100 to an entirety of assembly 100 may be painted to imprint corrosion resistance. In some embodiments, at least one component and/or part of assembly 100 may be painted to imprint corrosion resistance.

Figure 2:
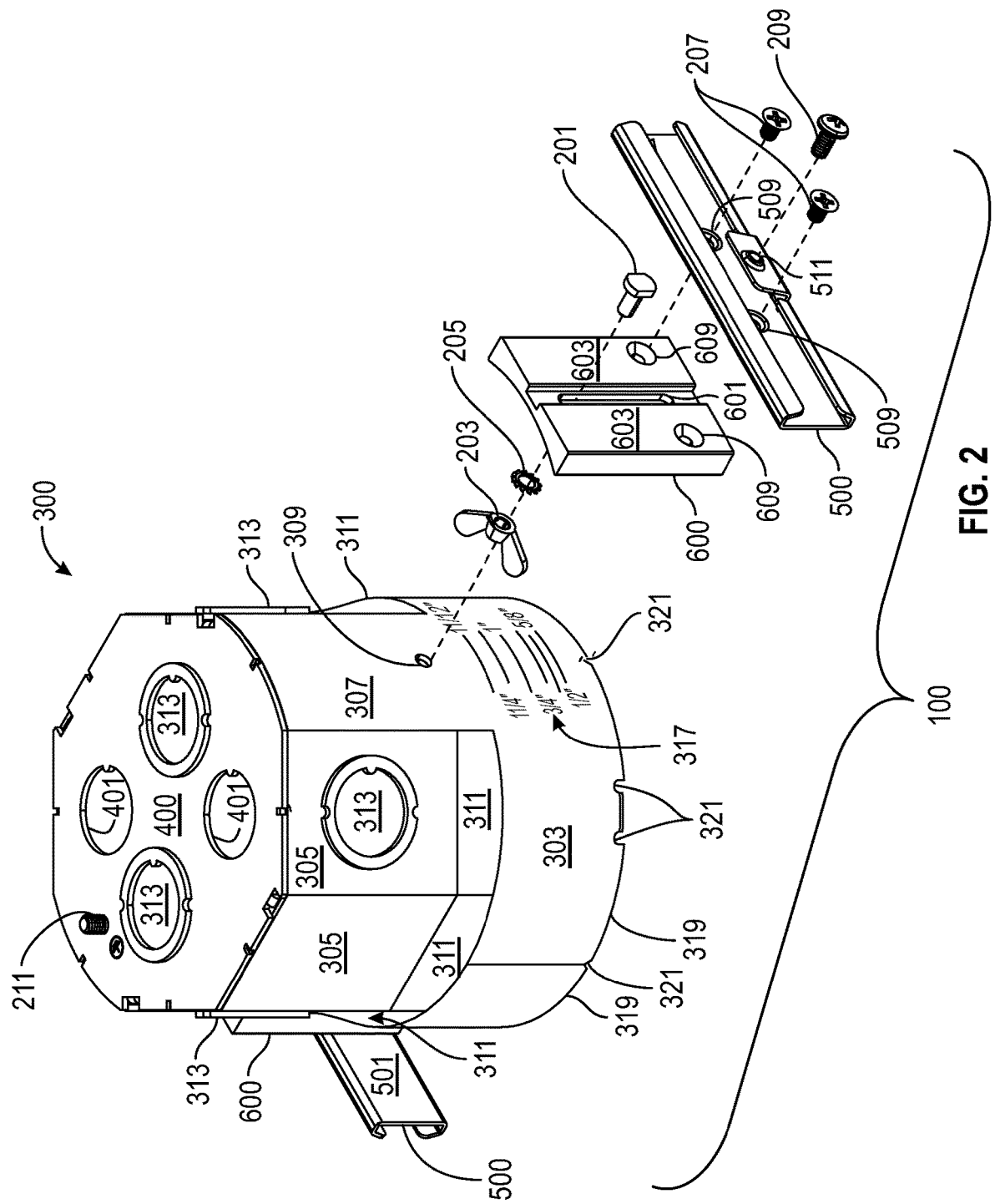
FIG. 2 may show a perspective view of the assembly of FIG. 1A that has been partially exploded to show at least some attachment mechanics.

FIG. 2 may show a perspective view of assembly 100 that has been partially exploded to show at least some attachment mechanics. In some embodiments, a given adjusting-plate 600 may be attached to a given curved-segment 307 of junction-box 300 by a carriage-bolt 201 passing through an adjustment-slot 601 of the given adjusting-plate 600 and into a complimentary hole 309 of curved-segment 307. In some embodiments, within cavity 327 of junction-box 300 a terminal (distal) end of 201 may be secured using a wing-nut 203 (see e.g., FIG. 1C and FIG. 2). In some embodiments, the wing-nut 203 shown in FIG. 2 when assembled into assembly 100 is within cavity 327 as shown in FIG. 1C. In some embodiments, a retainer-washer 205 may also be used along with wing-nut 203 to secure the carriage bolt 201 to junction-box 300 (see e.g., FIG. 1C and FIG. 2). In some embodiments, the retainer-washer 205 shown in FIG. 2 when assembled into assembly 100 is within cavity 327 as shown in FIG. 1C. In some embodiments, adjusting-slot 601 may have a length that is substantially parallel with lengths of junction-box 300 and of adjusting-plate 600. In some embodiments, the (finite) length of adjusting-slot 601 may allow its adjusting-plate 600 to be slid up or down vertically (with respect to the length of junction-box 300) and then secured using the carriage bolt 201 and the wing-nut 203 once a desired vertical position is obtained. In some embodiments, assembly 100 may further comprise at least one: carriage-bolt 201, wing-nut 203, and/or retainer-washer 205. In some embodiments, assembly 100 may further comprise two carriage-bolts 201, two wing-nuts 203, and two retainer-washers 205. In some embodiments, carriage-bolts 201, wing-nuts 203, and/or retainer-washers 205, may be replaced with substantially equivalent mechanical fastening means, such as, but not limited to, other types of bolts, screws, nails, pins, dowels, clips, nuts, washers, and/or the like.

Continuing discussing FIG. 2, in some embodiments, a given guide-rail 500 may be attached to a given adjusting-plate 600 by screws 207 being used to secure the given guide-rail 500 to the given adjusting-plate 600. In some embodiments, a given guide-rail 500 may comprise hole(s) 509 configured for securely receiving at least portions of screw(s) 207. In some embodiments, a given adjusting-plate 600 may comprise hole(s) 609 configured for securely receiving at least different portions of screw(s) 207. In some embodiments, hole(s) 509, hole(s) 609, and screw(s) 207 may complimentary work together for securing the given guide-rail 500 to the given adjusting-plate 600. In some embodiments, assembly 100 may further comprise at least one screw 207 to four screws 207. In some embodiments, screw(s) 207, may be replaced with substantially equivalent mechanical fastening means, such as, but not limited to, bolts, screws, nails, pins, dowels, clips, nuts, washers, hooks, glues, adhesives, welds, and/or the like.

Continuing discussing FIG. 2, in some embodiments, a given guide-rail 500 may also comprise a means for attaching to a given hanger-bar (see e.g., telescoping rails 156 of patent application Ser. No. 16/417,546 for such hanger-bars). In some embodiments, the rails of a given guide-rail 500 may be used for attaching to the given hanger-bar. In some embodiments, a screw 209 may be used to attach a given hanger-bar to a hole 511 of the given guide-rail 500 to secure that hanger-bar to that guide-rail 500. In some embodiments, a given guide-rail 500 may comprise at least one hole 511. In some embodiments, assembly 100 may further comprise at least one screw 209 to two screws 209. In some embodiments, screw(s) 209, may be replaced with substantially equivalent mechanical fastening means, such as, but not limited to, bolts, screws, nails, pins, dowels, clips, nuts, washers, hooks, glues, adhesives, welds, and/or the like.

Continuing discussing FIG. 2, in some embodiments, assembly 100 may comprise screw/bolt 209. In some embodiments, screw/bolt 209 may be removably attached to junction-box 300 and/or to lid 400. In some embodiments, screw/bolt 209 may be a "ground" screw/bolt; "ground" may be a typical term of art within the electrical and/or electronics industries/trades.

In some embodiments, assembly 100 may comprise at least one: junction-box 300, lid 400, guide-rail 500, adjusting-plate 600, carriage-bolt 201, and/or screw 207. In some embodiments, assembly 100 may comprise at least one junction-box 300, at least one lid 400, two guide-rails 500, two adjusting-plates 600, two carriage-bolts 201, and four screws 207. In some embodiments, assembly 100 may further comprise at least one: wing-nut 203, retainer-washer 205, and/or screw 209. See e.g., FIG. 1A, FIG. 1B, FIG. 1C, and FIG. 2.

Figure 3A:
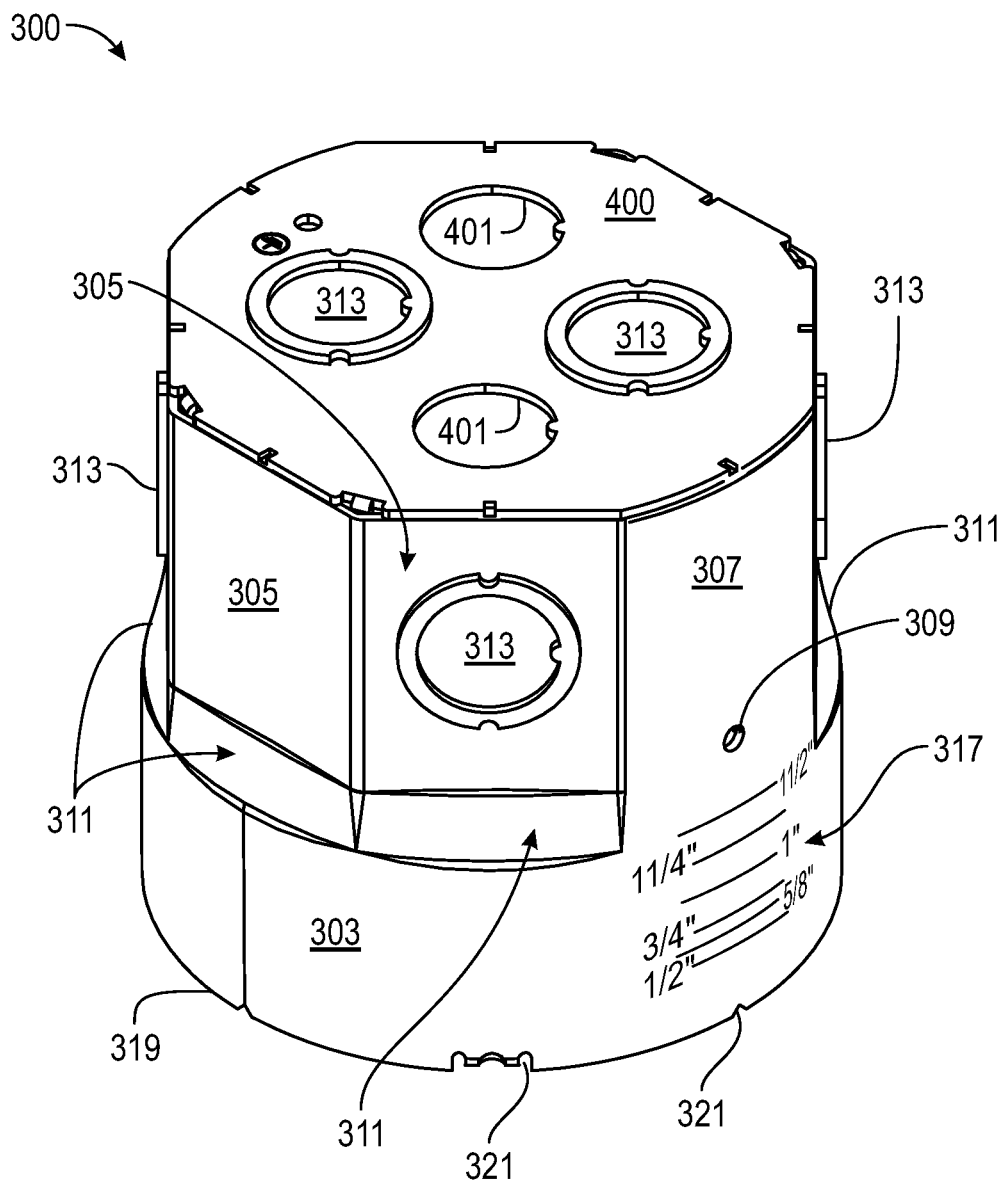
FIG. 3A may depict a side and top perspective view of a junction-box with a lid attached thereto.
Figure 3B:
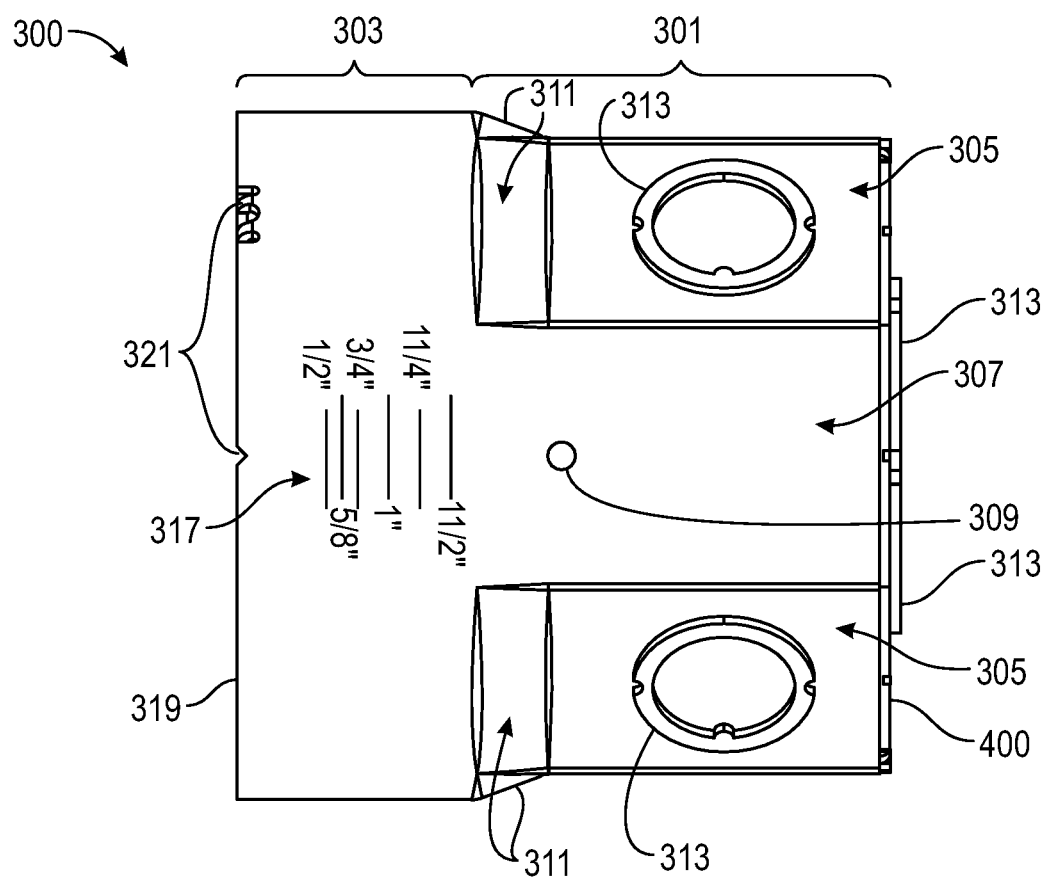
FIG. 3B may depict a side view of the junction-box of FIG. 3A with the lid 400 attached to the junction-box.
Figure 3C:
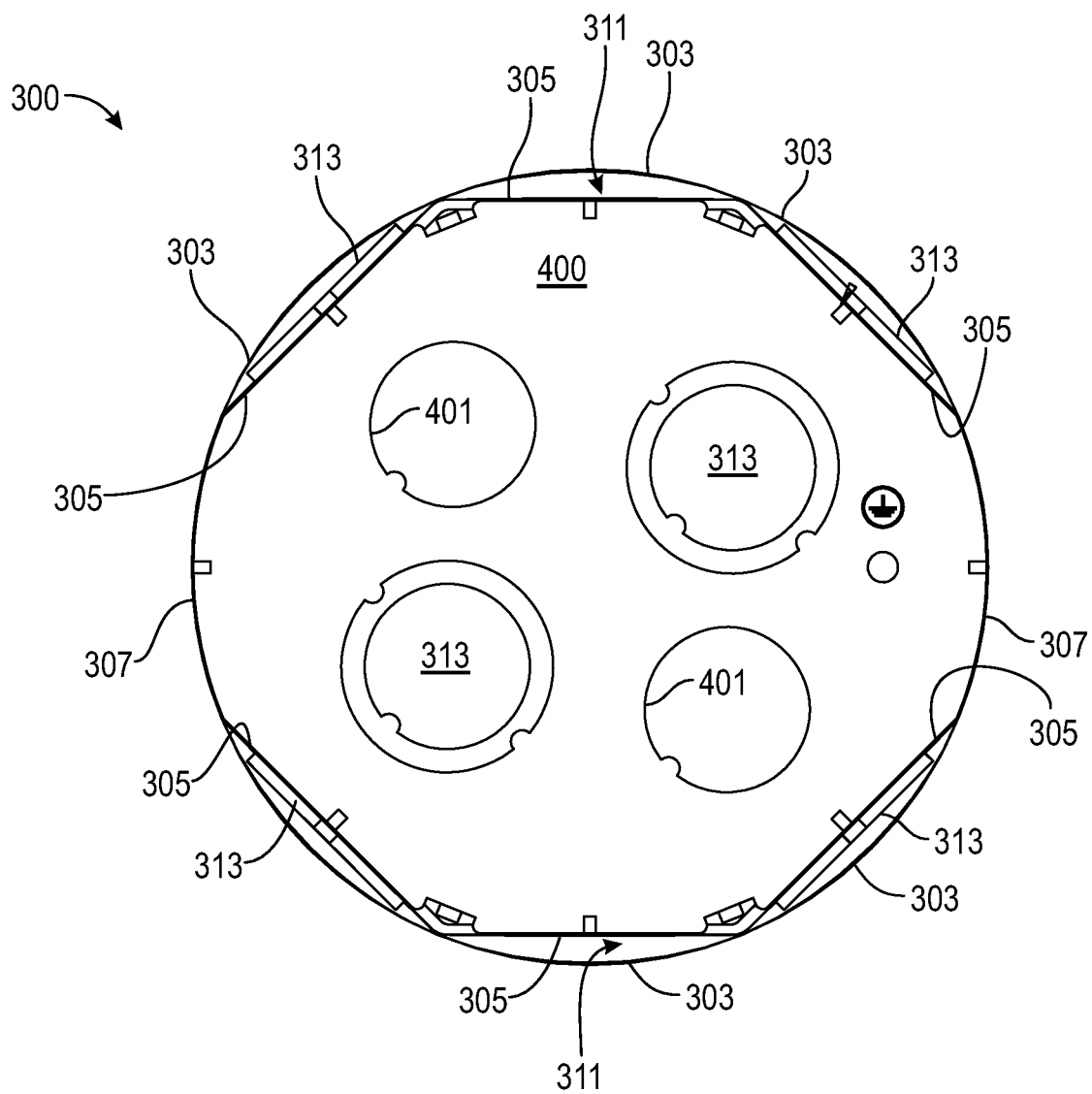
FIG. 3C may depict a top view of the junction-box of FIG. 3A with the lid 400 attached to the junction-box.
Figure 3D:
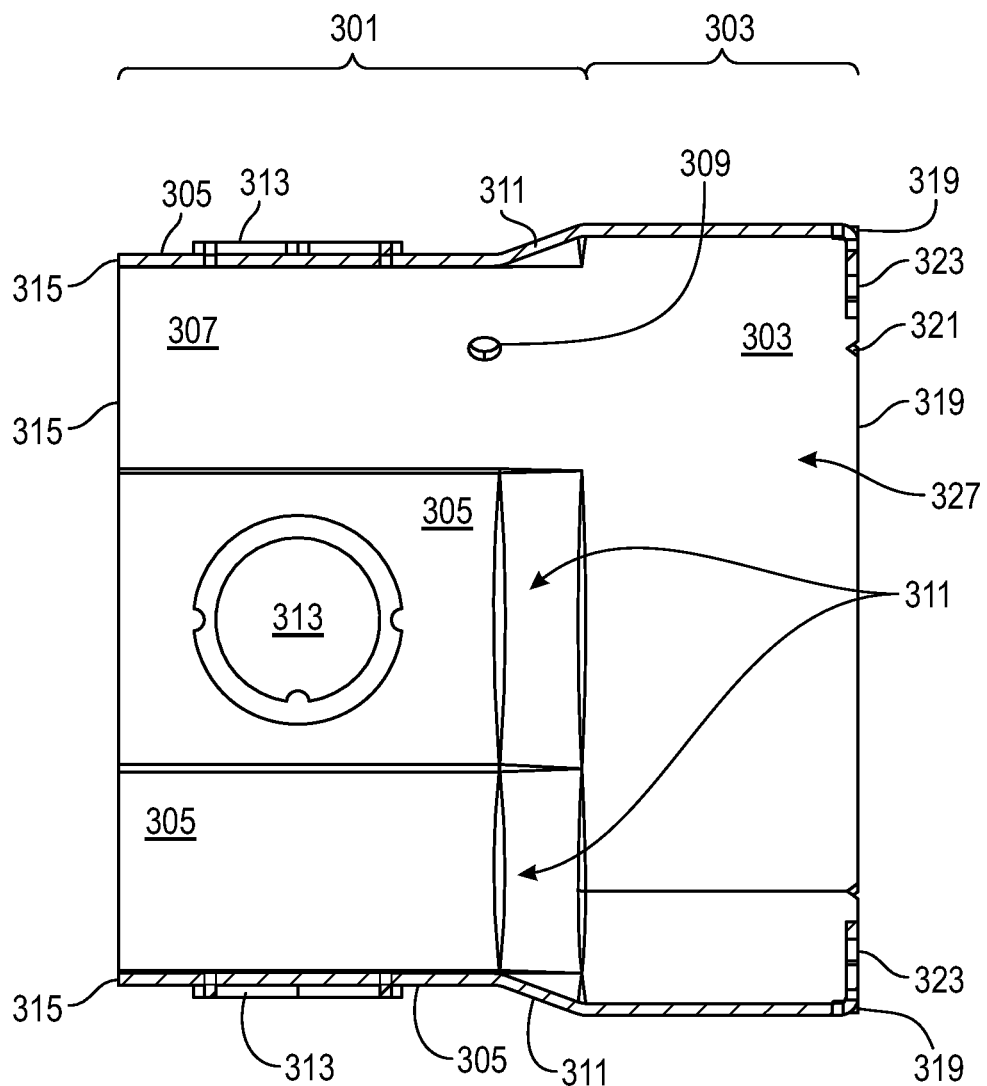
FIG. 3D may depict a cross-sectional side view of the junction-box of FIG. 3A with the lid detached from the junction-box.
Figure 3E:
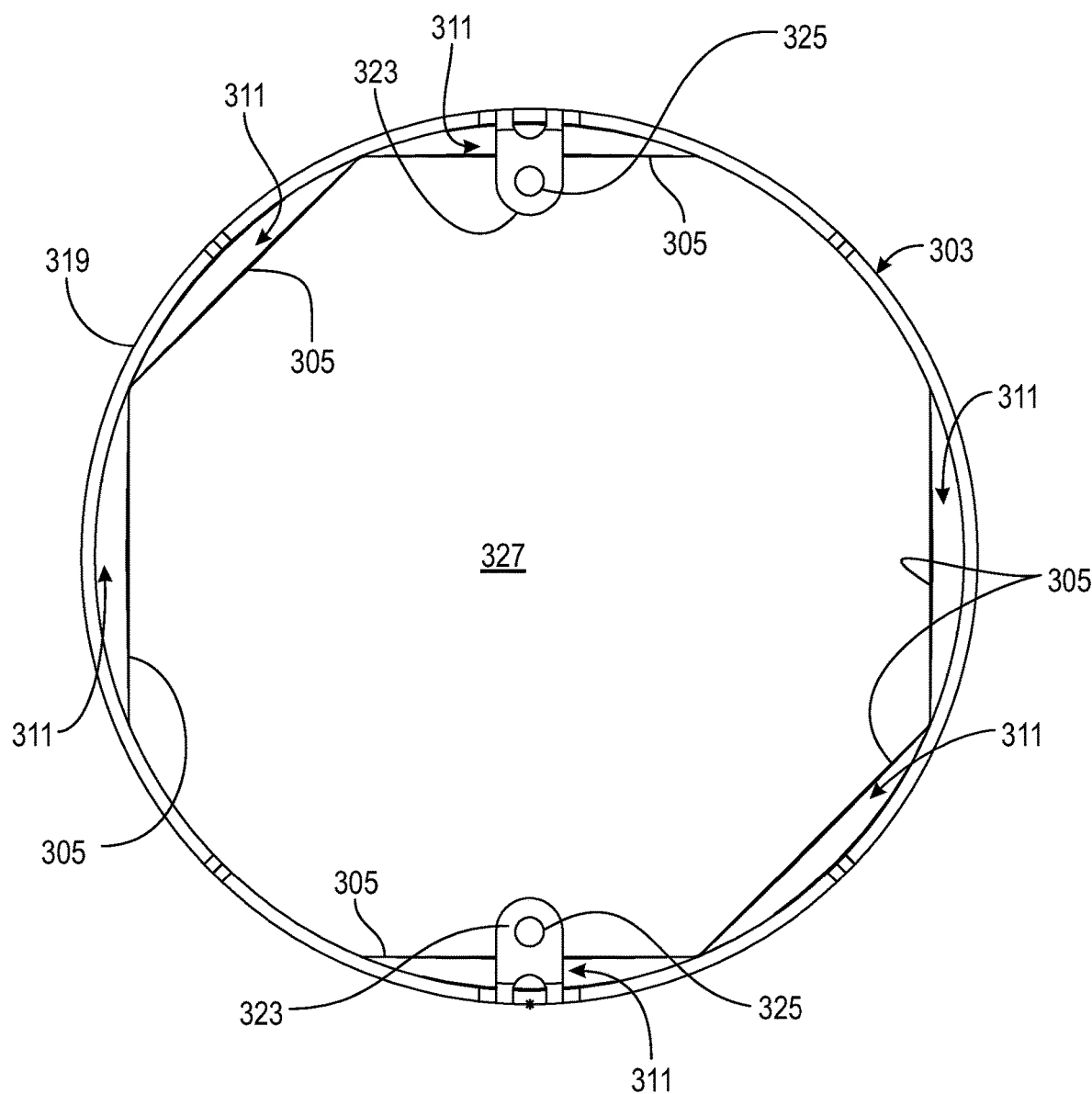
FIG. 3E may depict a bottom view of the junction-box of FIG. 3A with the lid detached from the junction-box.
Figure 3F:
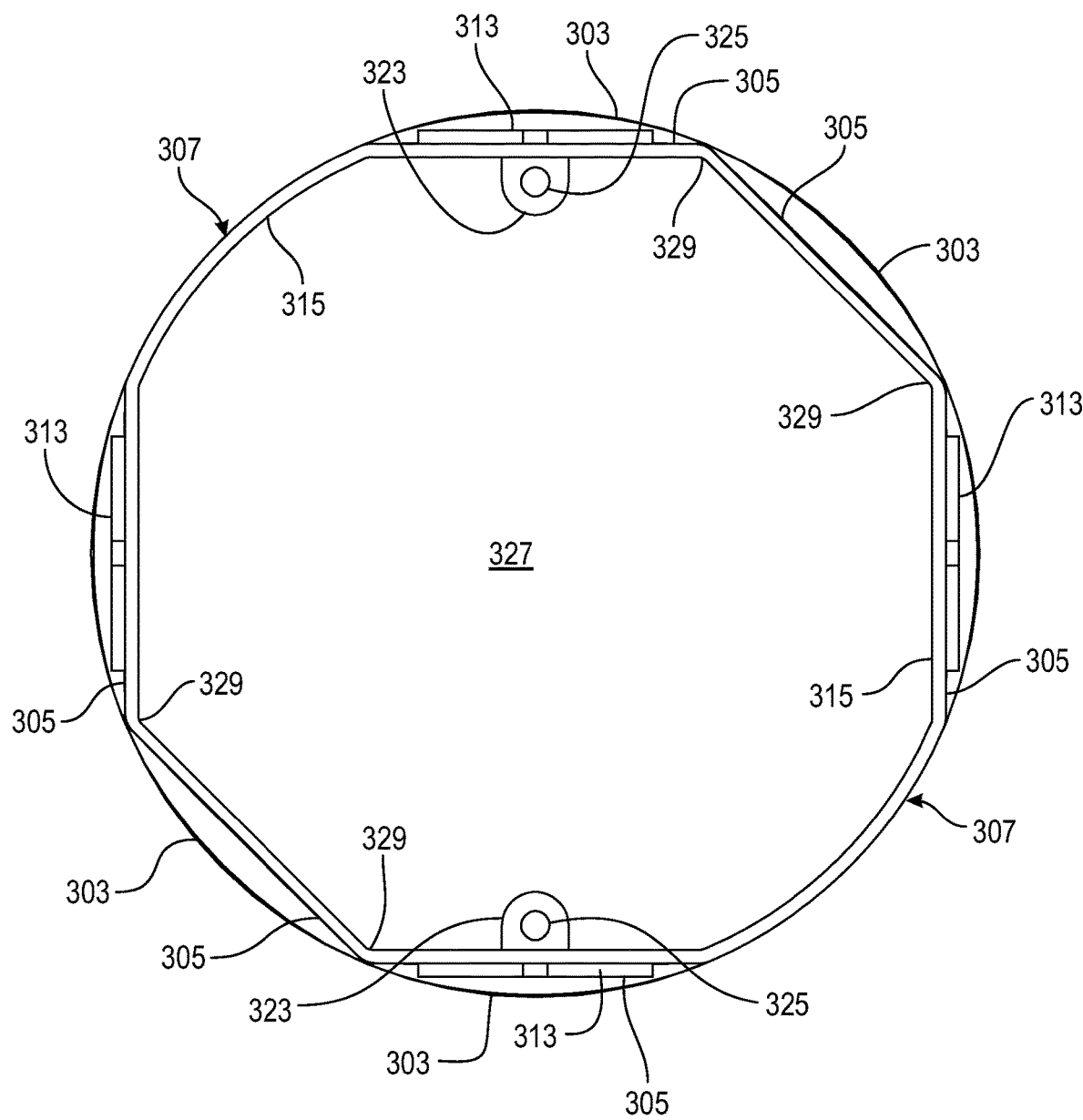
FIG. 3F may depict a top view of the junction-box of FIG. 3A with the lid detached from the junction-box.
Figure 3G:
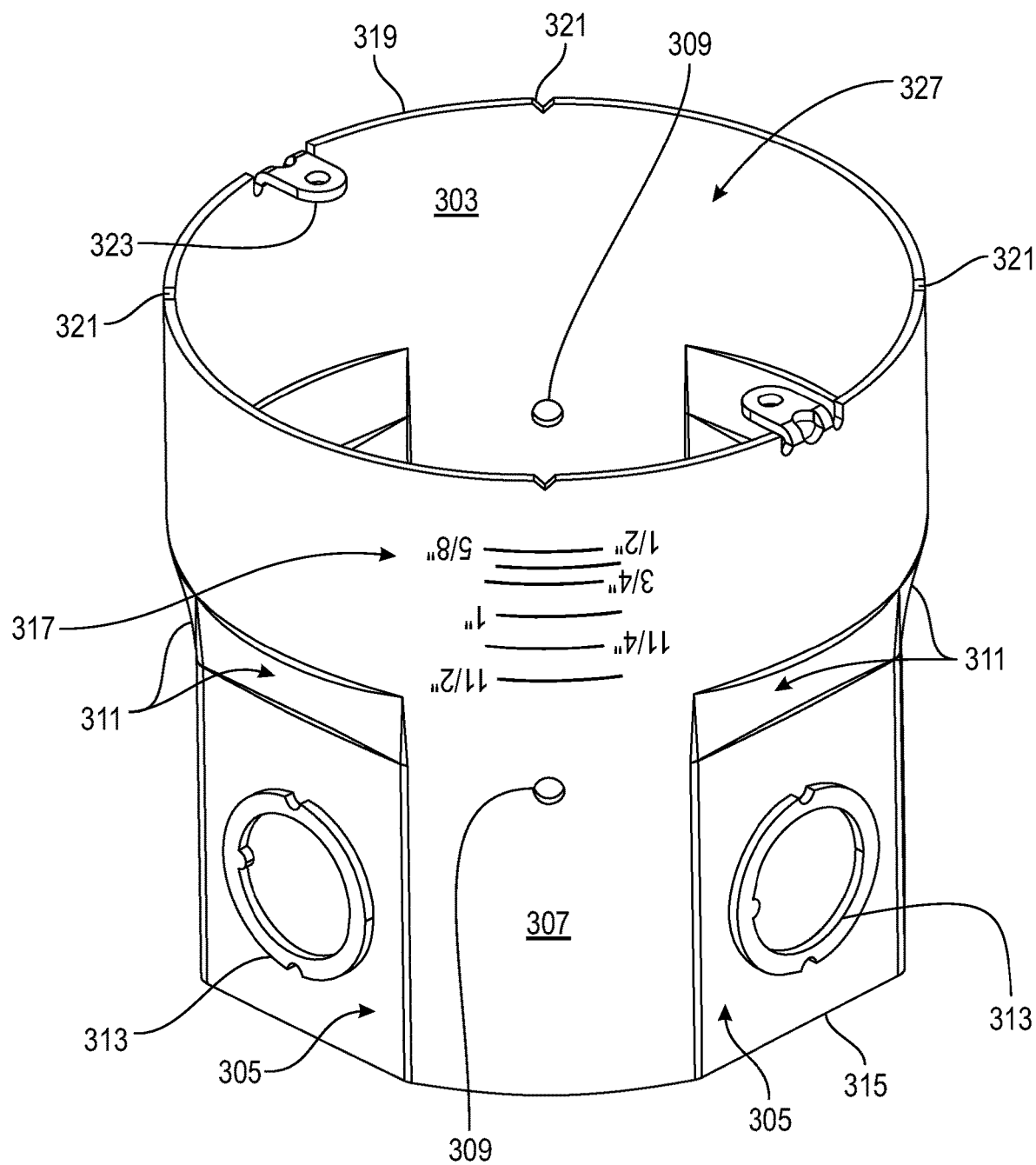
FIG. 3G may depict a bottom and side perspective view of the junction-box of FIG. 3A with the lid detached from the junction-box.

FIG. 3A may depict a side and top perspective view of a junction-box 300 with a lid 400 attached thereto. FIG. 3B may depict a side view of junction-box 300 with lid 400 attached thereto. FIG. 3C may depict a top view of junction-box 300 with lid 400 attached thereto. FIG. 3D may depict a cross-sectional side view of junction-box 300 (with lid 400 detached). FIG. 3E may depict a bottom view of junction-box 300 with (with lid 400 detached). FIG. 3F may depict a top view of junction-box 300 with (with lid 400 detached). FIG. 3G may depict a bottom and side perspective view of junction-box 300 with (with lid 400 detached). In some embodiments, junction-box 300 may comprise lid 400. In some embodiments, junction-box 300 may not comprise lid 400.

In some embodiments, a given junction-box 300 may be made from steel, such as, but not limited to, a steel pipe. In some embodiments, a given junction-box 300 may be zinc-plated. In some embodiments, a given junction-box 300 may be zinc-plated to at least six (6) micrometers.

In some embodiments, junction-box 300 may be sidewalls around a cavity 327. In some embodiments, junction-box 300 may comprise sidewalls around cavity 327. In some embodiments, these sidewalls may be continuous (with the only breaks/interruptions being hole(s) 309, hole-for-conduit 401, notches 321, and/or the like). In some embodiments, junction-box 300 may comprise an upper-portion 301 and a lower-portion 303. In some embodiments, may upper-portion 301 and lower-portion 303 may form the sidewalls of junction-box 300. With respect to the length of junction-box 300, junction-box 300 may be divided into the upper-portion 301 and the lower-portion 303 (cylindrical-portion 303). In some embodiments, upper-portion 301 may be located above lower-portion 303 (with respect to the vertical direction). In some embodiments, upper-portion 301 and lower-portion 303 may be a single article of manufacture. In some embodiments, upper-portion 301 may be attached to lower-portion 303. In some embodiments, upper-portion 301 may be integral with lower-portion 303. In some embodiments, upper-portion 301 may transition into lower-portion 303. In some embodiments, upper-portion 301 may transition substantially seamlessly into lower-portion 303. In some embodiments, upper-portion 301 may be longer than lower-portion 303. See e.g., FIG. 3B. In some embodiments, upper-portion 301 in cross-section may be more octagonal than cylindrical; whereas, lower-portion 303 may be substantially cylindrical (e.g., circular in cross-section). In some embodiments, lower-portion 303 may be shaped as a cylindrical body with a redetermined diameter. Compare figures FIG. 3B, FIG. 3C, FIG. 3E and FIG. 3F.

With respect to the cross-section through upper-portion 301 being more octagonal than cylindrical, upper-portion 301 may comprise six planar-faces 305 and two curved-segments 307 that are integrally formed as one mostly octagonal ring. In some embodiments, each planar-face 305 may be a substantially flat and planar region of upper-portion 301. In some embodiments, each planar-face 305 may be of substantially same dimensions, shapes, geometry, and/or structure as other planar-faces 305. In some embodiments, each curved-segment 307 may be a curved and/or rounded region of upper-portion 301. In some embodiments, each curved-segment 307 may be of substantially same dimensions, shapes, geometry, and/or structure as the other curved-segment 307. In some embodiments, each of the two curved-segments 307 may have a same curvature (same upper curvature) that is the same as a curvature (lower curvature) of the lower-portion 303. In some embodiments, a given planar-face 305 may be opposed opposite from another planar-face 305. In some embodiments, a given curved-segment 307 may be opposed opposite from the remaining curved-segment 307. In some embodiments, the two curved-segments 305 may be disposed opposite from each other having an upper diameter that is the same as the predetermined diameter of the lower-portion 303. In some embodiments, a given planar-face 305 is never disposed opposite from a curved-segment 307. In some embodiments, lengths of the six planar-faces 305 and lengths of the two curved-segments 307 may be all parallel with each other and all parallel with an overall length of the lighting-junction-box 300. In some embodiments, lengths of the six planar-faces 305 from top-edge 315 to bottoms of sloped-indentations 311 may be substantially similar to the lengths of the two curved-segments 307. In some embodiments, tops of the six planar-faces 305 and tops of the two curved-segments 307 all terminate at the top-edge 315. In some embodiments, the six planar-faces 305 may be interrupted by the curved-segments 307, such that a group of three closest planar-faces 305 are bracketed by the two curved-segments 307. In some embodiments, attachment between adjacent planar-faces 305 may be with respect to a shared vertical length of the two adjacent planar-faces 305. In some embodiments, attachment between an adjacent planar-face 305 and a curved-segment 307 may be with respect to shared vertical lengths of the planar-face 305 and its adjacent curved-segment 307. In some embodiments, a given planar-face 305 may be attached to at most two other planar-faces 305. In some embodiments, a given planar-face 305 may be attached to one other planar-face 305 and to one curved-segment 307. In some embodiments, a given curved-segment 307 may be attached to two planar-faces 305. In some embodiments, an angle 329 between two attached and adjacent planar-faces may be 135 degrees. In some embodiments, there may be four such angles 329 in a given junction-box 300. Compare figures FIG. 3C, FIG. 3E and FIG. 3F.

With respect to a closed perimeter around upper-portion 301, beginning that closed perimeter arbitrarily, may be begin with a first planar-face 305 attached to a second planar-face 305, wherein the second planar-face 305 may be attached to a third planar-face 305, wherein the third planar-face 305 may be attached to a first curved-segment 307, wherein the first curved-segment 307 may be attached to a fourth planar-face 305, wherein the fourth planar-face 305 may be attached to a fifth planar-face 305, wherein the fifth planar-face 305 may be attached to a sixth planar-face 305, wherein the sixth planar-face 305 may be attached to a second curved-segment 307, and wherein the second curved-segment 307 may be attached to the first planar-segment 305 to complete the closed perimeter that is more octagonal in shape than cylindrical. In some embodiments, the first planar-face 305, the second planar-face 305, the third planar-face 305, the fourth planar-face 305, the fifth planar-face 305, and the sixth planar-face 305 may be selected from the six planar-faces 305. In some embodiments, the first curved-segment 307 and the second curved-segment 307 may be selected from the two curved-segments 307. If upper-portion 301 was entirely octagonal, the six planar-faces 305 would correspond to six of the eight octagonal faces; however, the remaining two octagonal faces are not flat planar faces but are instead curved resulting in the two curved-segments 307. In some embodiments, a transverse-width between opposing planar-faces 305 may be shorter than the upper diameter between the two opposing curved-segments 307 and/or shorter than the predetermined diameter of lower-portion 303. In some embodiments, the upper diameter between the two opposing curved-segments 307 may be substantially the same as the predetermined diameter of lower-portion 303. Compare figures FIG. 3C, FIG. 3E and FIG. 3F.

In some embodiments, the first planar-face 305 may be disposed opposite from the fourth planar-face 305; the second planar-face 305 may be disposed opposite from the fifth planar-face 305; and the third planar-face 305 may be disposed opposite from the sixth planar-face 305. In some embodiments, any pair of oppositely disposed planar-faces 305 elected from the six planar-faces 305 may have a same transverse-width; and that same transverse-width may be less than the predetermined diameter of the lower-portion 303 and may be less than the upper diameter of the two curved-segments 307. Compare figures FIG. 3C, FIG. 3E and FIG. 3F.

With respect to a given curved-segment 307, in some embodiments, a given curved-segment 307 may comprise at least one hole 309 (carriage-bolt-receiving-hole 309). In some embodiments, the at least one carriage-bolt-receiving-hole 309 may be located on one or both of the two curved-segments 307. In some embodiments, hole 309 may be a through-hole that passe entirely through the side-wall/thickness of the given curved-segment 307. In some embodiments, hole 309 may be threaded. In some embodiments, hole 309 may be configured to receive at least a portion of carriage-bolt 201. In some embodiments, hole 309 may be configured to assist in the removable and/or sliding attachment of a given adjusting-plate 600 to junction-box 300. See e.g., FIG. 3A, FIG. 3B, FIG. 3G, and/or FIG. 2.

With respect to a given planar-face 305, in some embodiments, a given planar-face 305 may comprise at least one sloped-indentation 311. In some embodiments, sloped-indentation 311 may be a transition region where a given planar-face 305 of upper-portion 301 transitions into lower-portion 303. In some embodiments, each of the six planar-faces 305 may terminate away from the top-edge 315 in a sloped-indentation 311. In some embodiments, the sloped-indentation 311 of each of the six planar-faces 305 outwardly slopes to transition each of the six planar-faces 305 into the lower-portion 303. In some embodiments, at a top of sloped-indentation 311 may be flat, linear, and straight; whereas, a bottom of sloped-indentation 311 may be curved to match the curvature, radius, and/or diameter of lower-portion 303. In some embodiments, sloped-indentation 311 may slope outwards from its top to its bottom. See e.g., FIG. 3A and FIG. 3B.

With respect to a given curved-segment 307, in some embodiments, a given curved-segment 307 may have a same curvature, radius, and/or diameter as that of lower-portion 303. Thus, curved-segment 307 may require no transition region to lower-portion 303 to match curvature, radius, and/or diameter. Compare figures FIG. 3C, FIG. 3E and FIG. 3F.

In some embodiments, junction-box 300 may comprise at least one knockout-out 313 and/or at least one hole-for-conduit 401. In some embodiments, a given hole-for-conduit 401 may be a through hole that passes entirely through a portion of junction-box 300 and/or of lid 400. In some embodiments, a given hole-for-conduit 401 may be configured to receive a portion of electrical conduit. In some embodiments, a given knockout-out 313 may be removable from junction-box 300. In some embodiments, a given knockout-out 313 when attached to junction-box 300 may cover over a given hole-for-conduit 401. In some embodiments, a given knockout-out 313 may plug, close, and/or seal a given hole-for-conduit 401. In some embodiments, a given knockout-out 313 may be configured to break-away from junction-box 300 and/or from lid 400 when a minimal predetermined amount of differential force may be applied to the given knockout-out 313. In some embodiments, at least one planar-face 305 may comprise at least one hole-for-conduit 401. In some embodiments, at least one planar-face 305 may comprise at least one knockout-out 313. See e.g., FIG. 3A.

In some embodiments, upper-portion 301 may comprise a top-edge 315 along a periphery of its top. In some embodiments, a shape of the perimeter defined by top-edge 315 may be as noted above with respect to the discussion of planar-faces 305 and curved-segments 307; that is, the shape of this perimeter may be more octagonal than cylindrical. In some embodiments, a top of each planar-face 305 and a top of each curved-segment 307 may together form top-edge 315. In some embodiments, top-edge 315 may be disposed opposite from bottom-circular-edge 319. See e.g., FIG. 3D and/or FIG. 3F. In some embodiments, top-edge 315 may be attached to lid 400.

In some embodiments, lower-portion 303 may comprise at least one external-length-gauge 317. In some embodiments, lower-portion 303 may comprise two oppositely disposed external-length-gauges 317. In some embodiments, a given external-length-gauge 317 may be located on an exterior of lower-portion 303. In some embodiments, the at least one external-length-gauge 317 may be located on the lower-portion 303 below one or both of the two curved-segments 307. In some embodiments, a given external-length-gauge 317 may be located in linearly straight and vertical alignment with a given hole 309. In some embodiments, a given external-length-gauge 317 may be located below a given hole 309. In some embodiments, a given external-length-gauge 317 may comprise a plurality of markings/indicia on an exterior of lower-portion 303. In some embodiments, the plurality of markings/indicia be selected from a predetermined group of depth distance measurements. In some embodiments, the plurality of markings/indicia be selected from depth distance measurements of: half an inch (½ inch), three quarters of an inch (¾ inch), one inch (1 inch), one and one quarter of an inch (1 ¼ inch), and one and one half of an inch (1 ½ inch). In other embodiments, other units may be used. In other embodiments, other predetermined depth distance measurements may be used. In some embodiments, the plurality of markings/indicia are configured to convey length/depth gauge information to an installer of assembly 100, such that where a bottom of a given adjusting-plate 600 may match up with a given indicia of a given external-length-gauge 317. In some embodiments, the plurality of markings/indicia (external-length-gauge 317) be formed on the exterior of of lower-portion 303 by laser etching, molding, stamping, printing, label, sticker, writing, drawings, carving, portions thereof, combinations thereof, and/or the like. See e.g., FIG. 1A, FIG. 2, FIG. 3A, and FIG. 3B.

In some embodiments, a bottom of lower-portion 303 may end in bottom-circular-edge 319. In some embodiments, lower-portion 303 may comprise bottom-circular-edge 319. In some embodiments, bottom-circular-edge 319 may be disposed opposite from top-edge 315. In some embodiments, bottom-circular-edge 319 of lower-portion 303 may be substantially circular. In some embodiments, a perimeter shape defined by bottom-circular-edge 319 may be substantially circular. See e.g., FIG. 3A, FIG. 3B, FIG. 3E, and/or FIG. 3G.

In some embodiments, bottom-circular-edge 319 may comprise one or more notches 321. In some embodiments, a given notch 321 may interrupt circularity of bottom-circular-edge 319. In some embodiments, a given notch 321 may extend into bottom-circular-edge 319. See e.g., FIG. 3A, FIG. 3B, and/or FIG. 3E.

In some embodiments, junction-box 303 and/or lower-portion 303 may comprise at least one flange 323. In some embodiments, flange 323 may extend inwards (into cavity 327). In some embodiments, flange 323 may extend inwards (into cavity 327) from bottom-circular-edge 319. In some embodiments, two oppositely disposed flanges 323 may extend inwards (into cavity 327) from bottom-circular-edge 319. In some embodiments, a given flange 323 may comprise at least one hole 325. In some embodiments, a given hole 325 may extend entirely through a given flange 323. In some embodiments, flange 323 and/or hole 325 may provide an anchor location for securing other components and/or hardware to junction-box 303 and/or lower-portion 303. See e.g., FIG. 3D, FIG. 3E, FIG. 3F, and/or FIG. 3G.

In some embodiments, junction-box 300 may comprise sidewalls that may confine and/or bound a cavity 327 (internal volume) around sides of that cavity 327. In some embodiments, upper-portion 301 and lower-portion 303 may form the sidewalls of junction-box 300. In some embodiments, upper-portion 301 and lower-portion 303 may confine and/or bound cavity 327 (internal volume) around sides of that cavity 327. In some embodiments, when lid 400 may be attached to top-edge 315, then cavity 327 may have its top also confined/bound. In some embodiments, cavity 327 may be of a predetermined, fixed, static, and non-variable volume. In some embodiments, cavity 327 may be of 47.2 cubic inches (774 cubic centimeters). In some embodiments, cavity 327 may be of another predetermined volume. In some embodiments, cavity 327 may be configured to house/fit at least a portion of one or more of: an electronic component that is configured to emit light; a light emitter (e.g., a light emitter 114 from patent application Ser. No. 16/417,546); a light module; a light module driver; electronics; circuits; wiring; cabling; conduit; electronic hardware; a switch; a printer circuit board (PCB); an integrated circuit; portions thereof; combinations thereof; and/or the like. See e.g., FIG. 1C, FIG. 3D, FIG. 3E, FIG. 3F, and FIG. 3G for cavity 327.

Figure 4A:
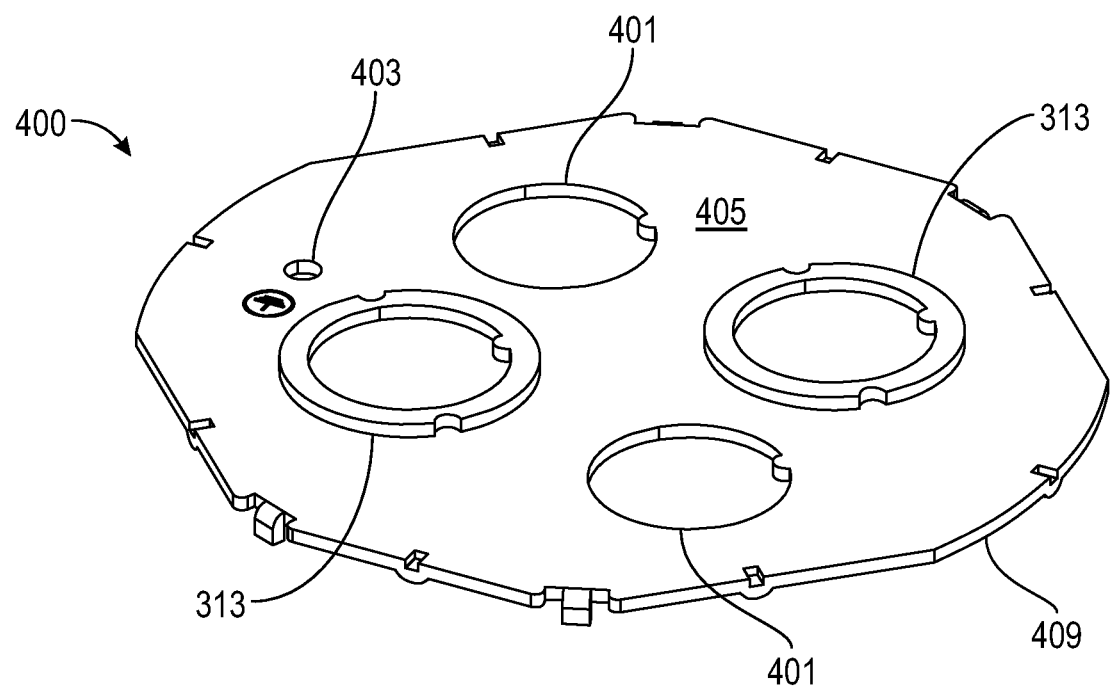
FIG. 4A may depict a top and side perspective view of a lid for a junction-box.
Figure 4B:
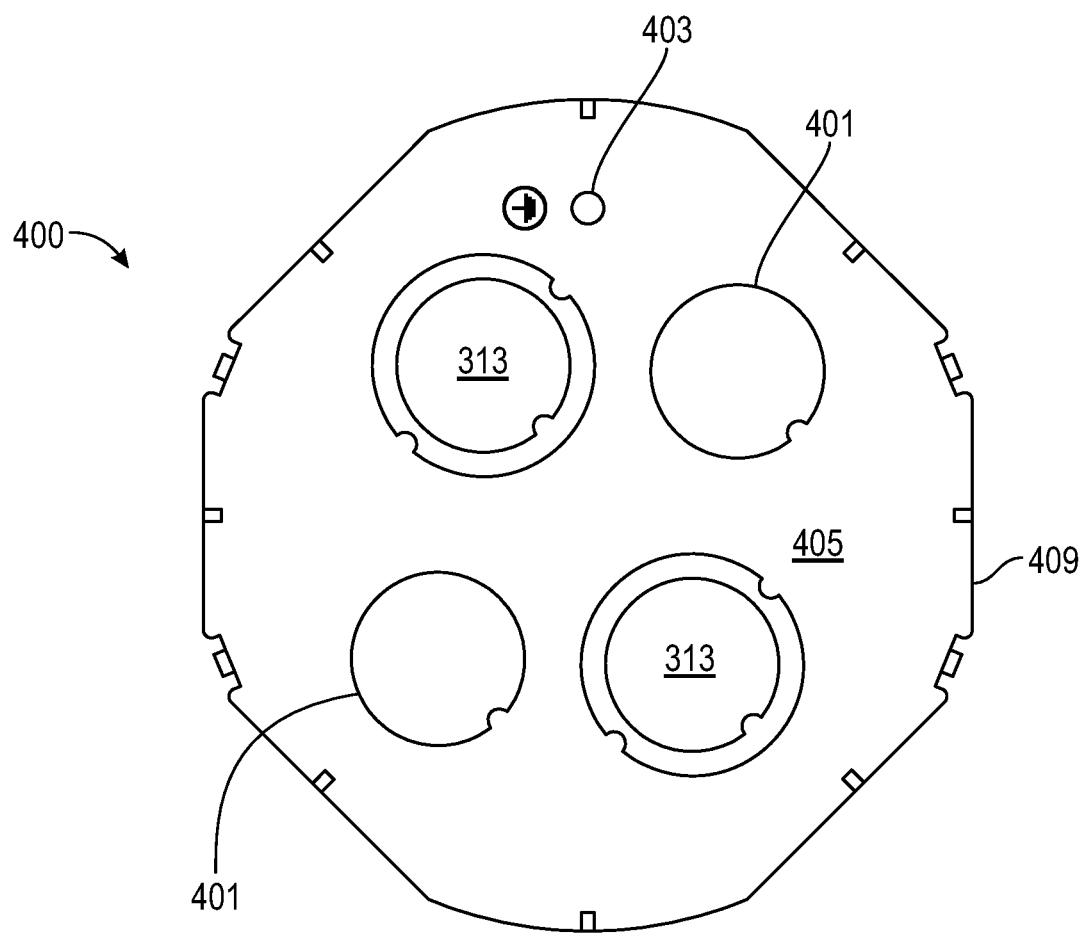
FIG. 4B may depict a top view of the lid of FIG. 4A.
Figure 4C:
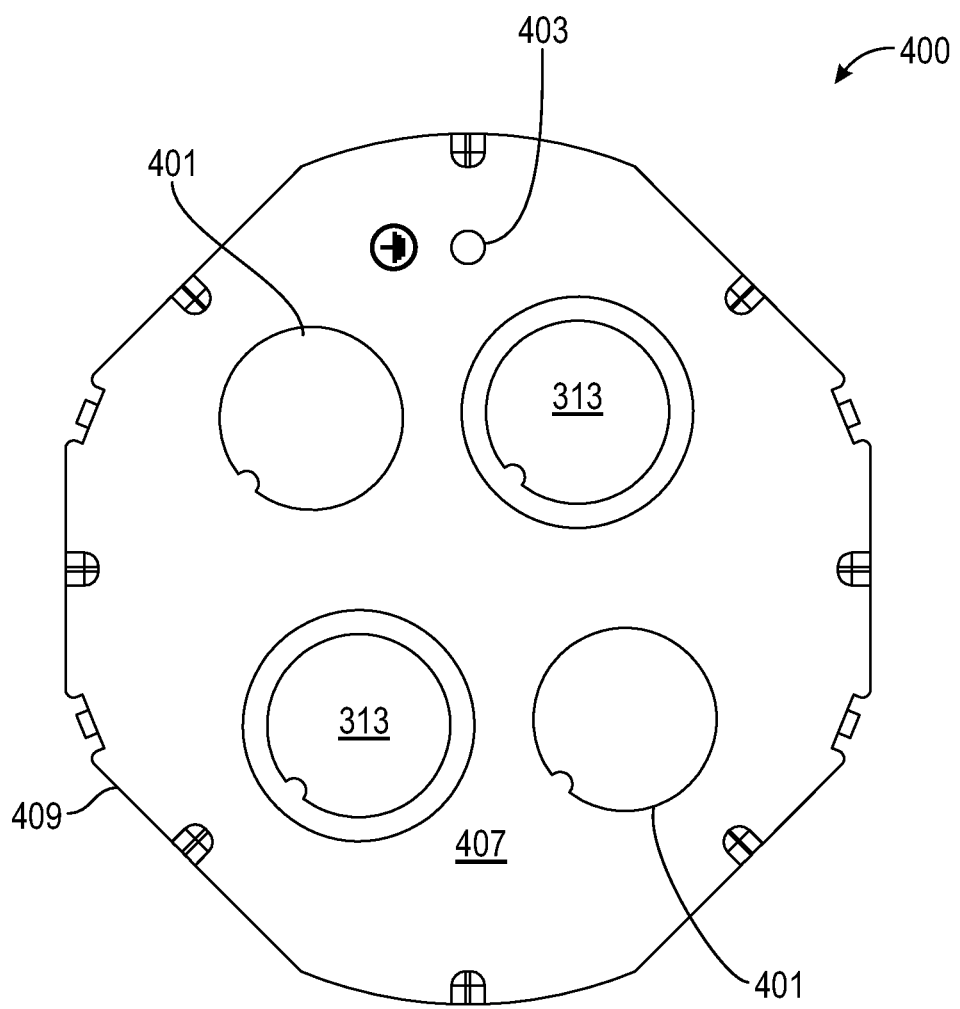
FIG. 4C may depict a bottom view of the lid of FIG. 4A.
Figure 4D:
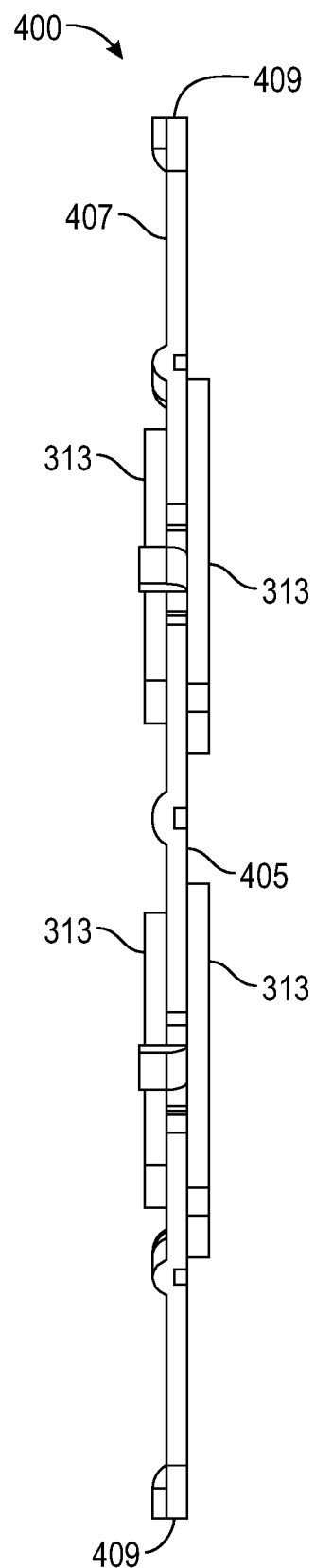
FIG. 4D may depict a side view of the lid of FIG. 4A.

FIG. 4A may depict a top and side perspective view of lid 400. FIG. 4B may depict a top view of lid 400. FIG. 4C may depict a bottom view of lid 400. FIG. 4D may depict a side view of lid 400. In some embodiments, a given lid 400 may be made from steel, such as, but not limited to, a cold-rolled steel. In some embodiments, a given lid 400 may be zinc-plated. In some embodiments, a given lid 400 may be zinc-plated to at least six (6) micrometers. In some embodiments, lid 400 may be attached to top-edge 315 of junction-box 300 to seal over cavity 327. In some embodiments, lid 400 may be attached on top of the top-edge 315. In some embodiments, lid 400 may be welded to top-edge 315. In some embodiments, lid 400 may comprise at least one hole-for-conduit 401. In some embodiments, lid 400 may comprise at least one knock-out 313. In some embodiments, lid 400 may comprise at least one hole 403. In some embodiments, hole 403 may be configured to receive at least a portion of screw/bolt 211. In some embodiments, lid 400 may comprise an external-side 405 and an internal-side 407. In some embodiments, external-side 405 may be disposed opposite from internal-side 407 by a thickness of lid 400. In some embodiments, when lid 400 may be attached to junction-box 300, external-side 405 may face away from assembly 100. In some embodiments, when lid 400 may be attached to junction-box 300, internal-side 407 may face cavity 327. In some embodiments, external-side 405 may comprise various indicia, such as, but not limited to, ground symbol, patent pending status notice, and/or patented notice indicator. In some embodiments, internal-side 407 may comprise various indicia, such as, but not limited to, cavity 327 (internal volume) size, design country of origin, and/or manufacturing country of origin. In some embodiments, running around an outside edge of lid 400 may be peripheral-edge 409. In some embodiments, a perimeter shape defined by peripheral-edge 409 may be substantially similar to the perimeter shape defined by top-edge 315.

Figure 5A:
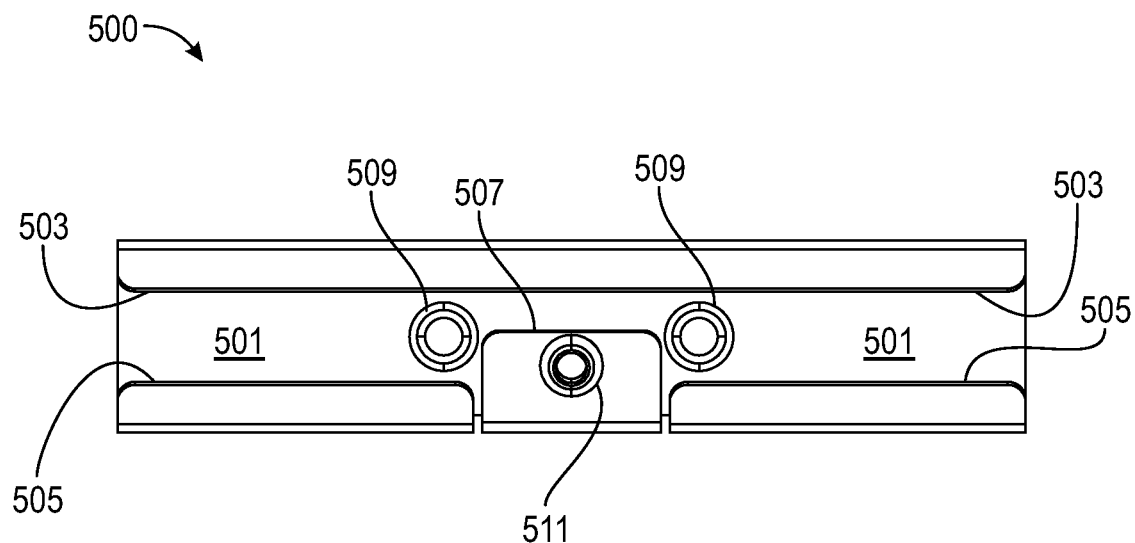
FIG. 5A may depict a front view of a guide-rail.
Figure 5B:
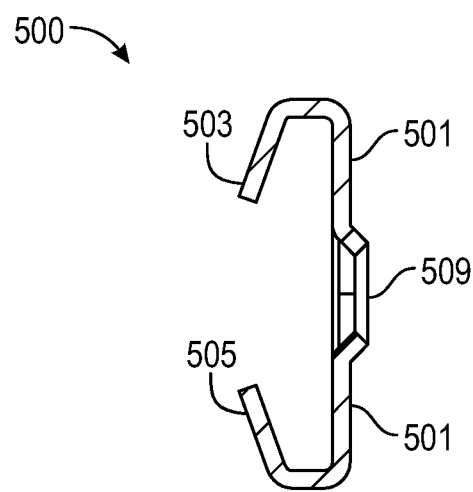
FIG. 5B may depict a cross-sectional view through a hole of the guide-rail of FIG. 5A.
Figure 5C:
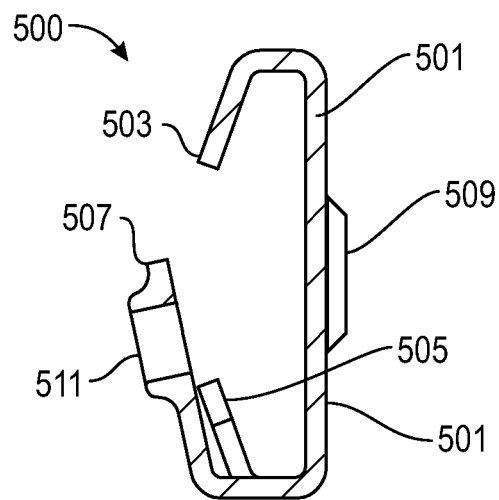
FIG. 5C may depict a cross-sectional view through a different hole of the guide-rail of FIG. 5A.

FIG. 5A may depict a front view of a guide-rail 500. FIG. 5B may depict a cross-sectional view through a hole 509 of the guide-rail 500. FIG. 5C may depict a cross-sectional view through a hole 511 of the guide-rail 500. In some embodiments, a given guide-rail 500 may be made from steel, such as, but not limited to, a cold-rolled steel. In some embodiments, a given guide-rail 500 may be zinc-plated. In some embodiments, a given guide-rail 500 may be zinc-plated to at least six (6) micrometers. In some embodiments, a given guide-rail 500 may be fixedly (but removably) attached to a given adjusting-plate 600 (see e.g., FIG. 1A and FIG. 2). In some embodiments, a given guide-rail 500 may be configured to be fixedly (but removably) attached to a given hanger-bar (see e.g., telescoping rails 156 from patent application Ser. No. 16/417,546 for an example of a hanger-bard). In some embodiments, a given guide-rail 500 may comprise a main-elongate-portion 501. In some embodiments, main-elongate-portion 501 may be elongate, rectangular, planar, straight, linear, rigid, and of fixed, static, and non-variable length. In some embodiments, all along a top length of main-elongate-portion 501, main-elongate-portion 501 may transition into top-guide-rail 503. In some embodiments, along bottom lengths of main-elongate-portion 501, main-elongate-portion 501 may transition into bottom-guide-rail(s) 505. In some embodiments, where top-guide-rail 503 and where bottom-guide-rail(s) 505 begin on main-elongate-portion 501 may be disposed opposite from each other. In some embodiments, transverse-width cross-sections through guide-rail 500 may show a C-bracket like component, with distal/terminal ends of top-guide-rail 503 and of bottom-guide-rail(s) 505 pointing towards a common location. However, top-guide-rail 503 and bottom-guide-rail(s) 505 do not physical touch each other. In some embodiments, disposed between two different bottom-guide-rails 505 may be one central-rail-guide 507. In some embodiments, along a middle/central bottom length of main-elongate-portion 501, main-elongate-portion 501 may transition into central-rail-guide 507. In some embodiments, bottom-guide-rails 505 and central-rail-guide 507 may be at different angles from main-elongate-portion 501. In some embodiments, guide-rail 500 and/or main-elongate-portion

501 may comprise at least one hole 509. In some embodiments, guide-rail 500 and/or main-elongate-portion 501 may comprise two holes 509. In some embodiments, hole 509 may be through hole through a portion of main-elongate-portion 501. In some embodiments, hole 509 may be threaded. In some embodiments, hole 509 may be configured to receive at least a portion of screw 207. In some embodiments, guide-rail 500 and/or central-guide-rail 507 may comprise at least one hole 511. In some embodiments, hole 511 may be through hole through a portion of central-guide-rail 507. In some embodiments, hole 511 may be threaded. In some embodiments, hole 511 may be configured to receive at least a portion of screw 209.

Figure 6A:
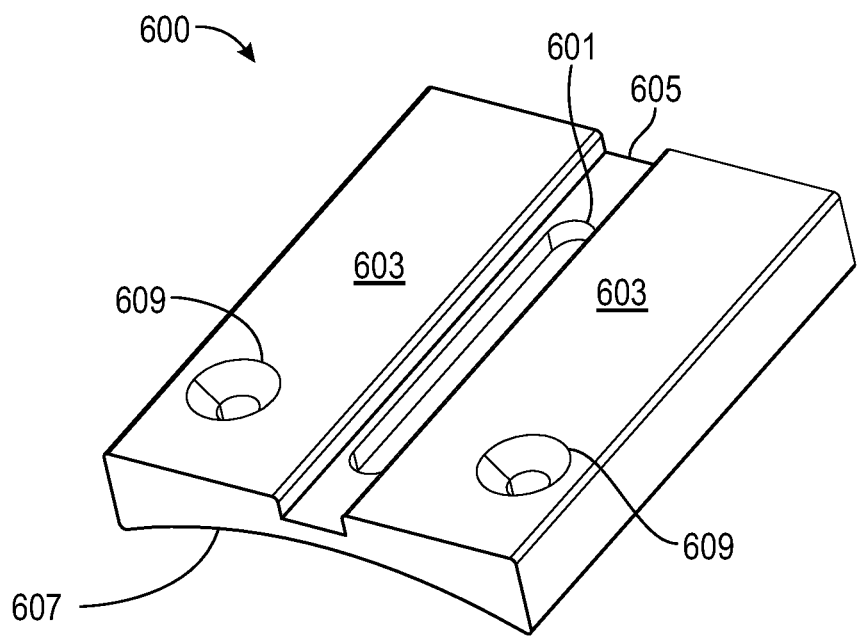
FIG. 6A may depict a front perspective view of an adjusting-plate.
Figure 6B:
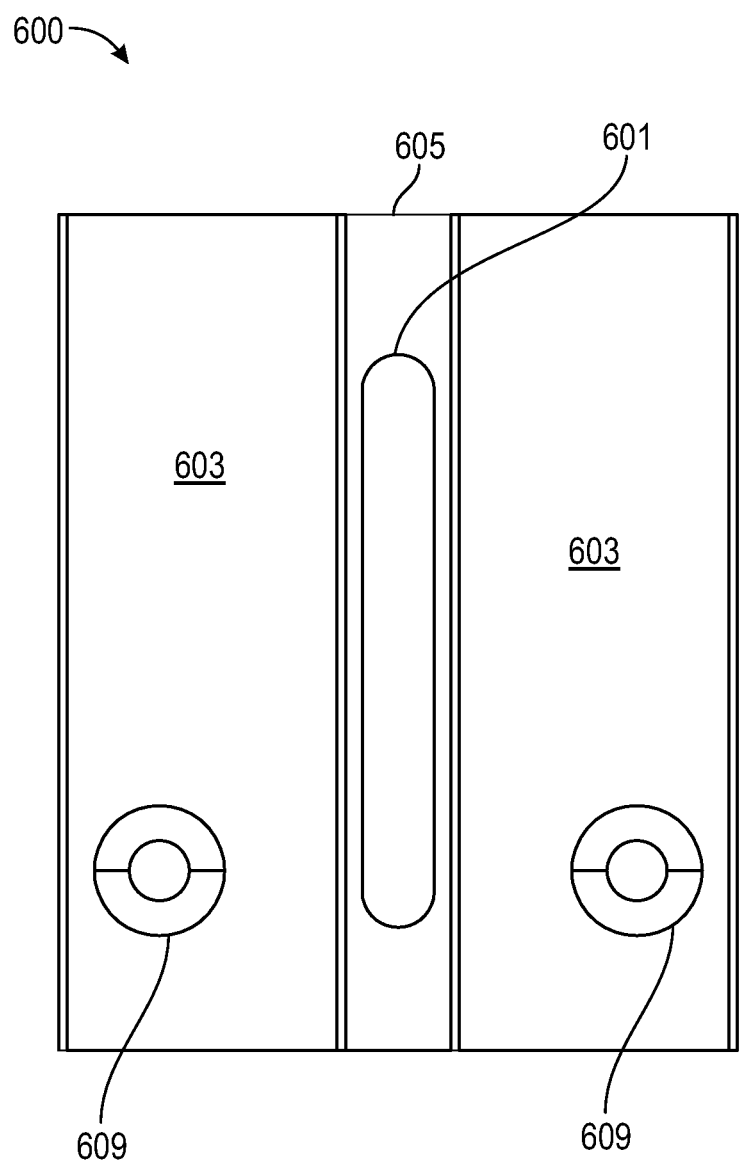
FIG. 6B may depict a front view of the adjusting-plate of FIG. 6A.
Figure 6C:
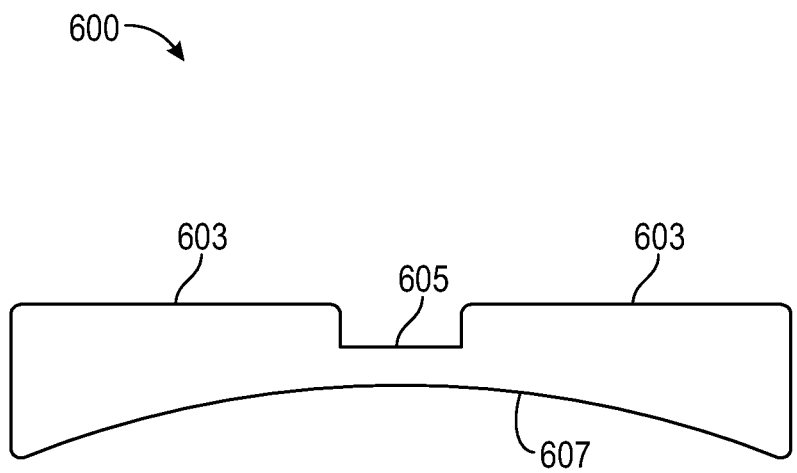
FIG. 6C may depict an end view of the adjusting-plate of FIG. 6A.
Figure 6D:
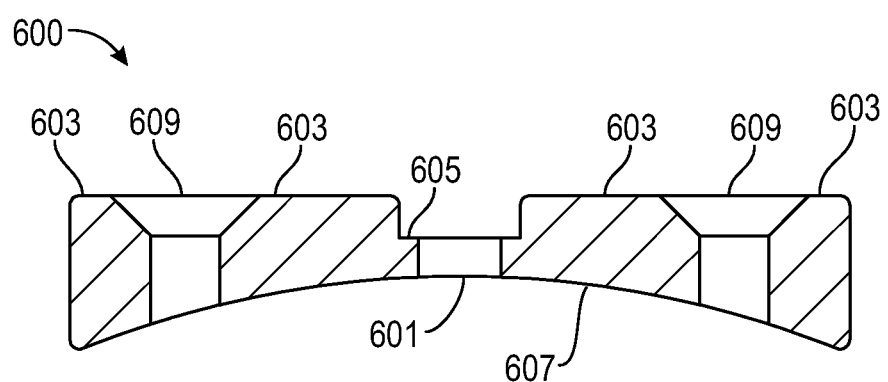
FIG. 6D may depict a cross-sectional view of the adjusting-plate of FIG. 6A through a transverse-width of the adjusting-plate that passes through an adjustment-slot, a channel, and holes of the adjusting-plate.

FIG. 6A may depict a front perspective view of an adjusting-plate 600. FIG. 6B may depict a front view of adjusting-plate 600. FIG. 6C may depict an end view of adjusting-plate 600. (FIG. 6C may depict a top or a bottom end view of adjusting-plate 600.) FIG. 6D may depict a cross-sectional view of adjusting-plate 600 through a transverse-width of adjusting-plate 600 that passes through adjustment-slot 601, channel 605, and holes 609. In some embodiments, a given adjusting-plate 600 may be made from steel. In some embodiments, a given adjusting-plate 600 may be zinc-plated. In some embodiments, a given adjusting-plate 600 may be zinc-plated to at least six (6) micrometers. In some embodiments, a given adjusting-plate 600 may comprise at least one adjustment-slot 601. In some embodiments, adjustment-slot 601 may have a length that is substantially parallel with a length of adjusting-plate 600. In some embodiments, the length of adjustment-slot 601 may be shorter than the length of adjusting-plate 600. In some embodiments, a width of adjustment-slot 601 may be sized to receive at least a portion of carriage-bolt 201. In some embodiments, the length of adjustment-slot 601 may be sized to correspond to a distance between the minimum and the maximum of the plurality of markings/indicia of external-length-gauge 317. In some embodiments, adjustment-slot 601 may pass entirely through a thickness of adjusting-plate 600. In some embodiments, a given adjusting-plate 600 may comprise a flat-front 603 that may be substantially flat, planar, and/or smooth. In some embodiments, given adjusting-plate 600 may comprise a channel 605 that may bisect flat-front 603. In some embodiments, channel 605 may be a recess in flat-front 603, bisecting flat-front 603. In some embodiments, channel 605 may run the length of adjusting-plate 600. In some embodiments, channel 605 may be a recessed linear portion of adjusting-plate 600. In some embodiments, channel 605 may be a recessed linear portion of flat-front 603. In some embodiments, adjustment-slot 601 may be located in channel 605. In some embodiments, a length of channel 605 may be substantially parallel with the length of adjustment-slot 601. In some embodiments, adjusting-plate 600 may comprise curved-back 607. In some embodiments, curved-back 607 may be disposed opposite from flat-front 603. In some embodiments, curved-back 607 may have a roundness, curvature, radius, and/or diameter that is complimentary to the roundness, curvature, radius, and/or diameter of lower-portion 303 and/or of curved-segment 307. In some embodiments, curved-back 607 may have a roundness, curvature, radius, and/or diameter that may substantially match the roundness, curvature, radius, and/or diameter of lower-portion 303 and/or of curved-segment 307. In some embodiments, curved-back 607 may slidingly translate up or down (vertically) along lower-portion 303 and/or along curved-segment 307, with curved-back 607 being in substantial physical contact with lower-portion 303 and/or with curved-segment 307. In some embodiments, adjusting-plate 600 may comprise at least one hole 609. In some embodiments, adjusting-plate 600 may comprise two holes 609. In some embodiments, holes 609 may be separated from each other by channel 605 and/or by adjustment-slot 601. In some embodiments, hole 609 may pass entirely through a thickness of adjusting-plate 600. In some embodiments, hole 609 may be threaded. In some embodiments, hole 609 may be configured to receive at least a portion of screw 207.

In some embodiments, adjusting-plate 600 may comprise a front surface (flat-front 603), a rear surface (curved-back 607), and an adjustment-slot 601. In some embodiments, flat-front 603 may be used interchangeably with the front surface. In some embodiments, curved-back 607 may be used interchangeably with the rear surface. In some embodiments, the front surface may be substantially flat and planar. In some embodiments, the rear surface may have a predetermined curve. In some embodiments, the rear surface may be disposed opposite from the front surface and separated from the front surface by a thickness of the adjusting-plate 600. In some embodiments, the predetermined curve has a plate curvature that is configured to complimentary match an external curvature of a cylindrical portion of junction-box 300 such that the rear surface is freely slidable against the cylindrical portion of junction-box 300, with a majority of the rear surface being in physical contact with the cylindrical portion of junction-box 300. In some embodiments, adjustment-slot 601 may be an elongate slot that passes entirely through the adjusting-plate 600 from the front surface to the rear surface. In some embodiments, a length of adjustment-slot 601 may be less than a length of adjusting-plate 600. In some embodiments, the length of adjustment-slot 601 may be substantially parallel with the length of adjusting-plate 600. In some embodiments, adjustment-slot 601 has a width that is configured to removably receive at least a portion of carriage-bolt 201. In some embodiments, an orthogonal projection of adjusting-plate 600 with respect to a front, a rear, or a side of adjusting-plate 600 may be rectangular in shape (or substantially rectangular in shape); whereas, an orthogonal protection of a top or a bottom of adjusting-plate 600 is not rectangular in shape. In some embodiments, with respect to a transverse-width of adjusting-plate 600, adjustment-slot 601 may be located in a middle of adjusting-plate 600. See e.g., FIG. 6A, FIG. 6B, FIG. 6C, and FIG. 6D.

In some embodiments, with respect to the length of adjusting-plate 600, adjusting-plate 600 may comprise two holes 609 that may be located in a bottom one third of the length of adjusting-plate 600, being located closer to a bottom edge of adjusting-plate 600 than to a top edge of adjusting-plate 600, wherein the bottom edge is disposed opposite from the top edge of adjusting-plate 600. In some embodiments, the two holes 609 may be through holes that pass entirely through the thickness of adjusting-plate 600 from the front surface (flat-front 603) to the rear surface (curved-back 607). In some embodiments, each of the two holes 609 may be configured to receive a screw 207. In some embodiments, the two holes 609 may be separated from each other by adjustment-slot 601 and/or by channel 605 of adjusting-plate 600. See e.g., FIG. 6A, FIG. 6B, and FIG. 6D.

In some embodiments, assembly 100 and/or portions thereof (e.g., lid 400 to top-edge 315) may be fire rated.

In some embodiments, welds of assembly 100 and/or portions thereof (e.g., lid 400 to top-edge 315) may withstand a load of 300 pounds (lbs.).

In some embodiments, carriage-bolt(s) 201, wing-nut(s) 203, retainer-washer(s) 205, screw(s) 207, screw(s) 209, screw(s) 211, hole(s) 309, hole(s) 403, hole(s) 509, hole(s) 511, hole(s) 609, portions thereof, combinations thereof, and/or the like, may be threaded and/or complimentary threaded. In some embodiments, carriage-bolt(s) 201, screw(s) 207, screw(s) 209, screw(s) 211, portions thereof, combinations thereof, and/or the like, may be male threaded. In some embodiments, wing-nut(s) 203, retainer-washer(s) 205, hole(s) 309, hole(s) 403, hole(s) 509, hole(s) 511, hole(s) 609, portions thereof, combinations thereof, and/or the like, may be female threaded.

Lighting junction boxes with assemblies for attaching to hanger bars that may be slidingly adjustable have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A lighting-junction-box comprising:
continuous sidewalls that surround a cavity, wherein the cavity is configured to house an electronic component that is configured to emit light, wherein the continuous side-walls are divided into an upper-portion and a lower-portion, wherein with respect to a vertical direction the upper-portion is disposed above the lower-portion, wherein the vertical direction runs from a bottom-circular-edge of the lower-portion to a top-edge of the upper-portion, wherein the upper-portion and the lower-portion are integral with each other;
the lower-portion is shaped as a cylindrical body with a predetermined diameter, wherein the bottom-circular-edge of the lower-portion is substantially circular; and
the upper-portion is comprised of six planar-faces and two curved-segments, wherein each of the six planar-faces are substantially flat and planar members, wherein each of the two curved-segments have a same curvature that is the same as a curvature of the lower-portion, wherein lengths of the six planar-faces and lengths of the two curved-segments are all parallel with each other and all parallel with an overall length of the lighting-junction-box, wherein tops of the six planar-faces and tops of the two curved-segments all terminate at the top-edge, wherein the two curved-segments are disposed opposite from each other having an upper diameter that is the same as the predetermined diameter of the lower-portion;
wherein with respect to a top view of the lighting-junction-box the top-edge of the upper-portion is shaped substantially octagonal as follows: a first planar-faces is attached to a second planar-face, the second-planar-face is attached to a third planar-face, the third planar-face is attached to a first curved-segment, the first curved-segment is attached to a fourth planar-face, the fourth planar-face is attached to a fifth planar-face, the fifth planar-face is attached to a sixth planar-face, the sixth planar-face is attached to a second curved-segment, and the second curved-segment is attached to the first planar-face; wherein the first planar-face, the second planar-face, the third planar-face, the fourth planar-face, the fifth planar-face, and the sixth planar-face are selected from the six planar-faces; wherein the first curved-segment and the second curved-segment are selected from the two curved-segments.

2. The lighting-junction-box according to claim 1, wherein the lighting-junction-box comprises at least one carriage-bolt-receiving-hole that is configured to receive a carriage-bolt for removable attachment of an adjusting-plate to the lighting-junction-box; wherein the at least one carriage-bolt-receiving-hole is located on one or both of the two curved-segments.

3. The lighting-junction-box according to claim 1, wherein the lighting-junction-box comprises at least one external-length-gauge that is a plurality of external depth markings; wherein the at least one external-length-gauge is located on the lower-portion below one or both of the two curved-segments.

4. The lighting-junction-box according to claim 3, wherein the plurality of external depth markings are markings of: one half of an inch, five eights of an inch, three quarters of an inch, one inch, one and one quarter of an inch, and one and one half of an inch.

5. The lighting-junction-box according to claim 3, wherein at least one of the two curved-segments comprise a carriage-bolt-receiving-hole that is configured to receive a carriage-bolt for removable attachment of an adjusting-plate to the lighting-junction-box, wherein the carriage-bolt-receiving-hole is centered above the at least one external-length-gauge.

6. The lighting-junction-box according to claim 1, wherein each of the six planar-faces terminates away from the top-edge in a sloped-indentation, wherein the sloped-indentation of each of the six planar-faces outwardly slopes to transition each of the six planar-faces into the lower-portion.

7. The lighting-junction-box according to claim 1, wherein the first planar-face is disposed opposite from the fourth planar-face; wherein the second planar-face is disposed opposite from the fifth planar-face; wherein the third planar-face is disposed opposite from the sixth planar-face.

8. The lighting-junction-box according to claim 7, wherein any pair of oppositely disposed planar-faces selected from the six planar-faces have a same transverse-width; wherein the same transverse-width is less than the predetermined diameter of the lower-portion and is less than the upper diameter of the two curved-segments.

9. The lighting-junction-box according to claim 1, wherein the lighting-junction-box comprises at least one hole configured to receive a portion of electrical conduit, wherein the at least one hole is located on an exterior of the lighting-junction-box.

10. The lighting-junction-box according to claim 9, wherein the lighting-junction-box comprises at least one knock-out, wherein the at least one knock-out covers over the at least one hole.

11. The lighting-junction-box according to claim 1, wherein the lighting-junction-box comprises a lid that is attached on top of the top-edge.

12. An adjusting-plate comprising:
a front surface that is substantially flat and planar;
a rear surface that has a predetermined curve, wherein the rear surface is disposed opposite from the front surface and separated from the front surface by a thickness of the adjusting-plate, wherein the predetermined curve has a curvature that is configured to complimentary match an external curvature of a cylindrical portion of a junction-box such that the rear surface is freely slidable against the cylindrical portion with a majority of the rear surface being in physical contact with the cylindrical portion; and an adjustment-slot that is an elongate slot that passes entirely through the adjusting-plate from the front surface to the rear surface, wherein a length of the adjustment-slot is less than a length of the adjusting-plate, wherein the length of the adjustment-slot is substantially parallel with the length of the adjusting-plate, wherein the adjustment-slot has a width that is configured to removably receive at least a portion of a carriage bolt.

13. The adjusting-plate according to claim 12, wherein an orthogonal projection of the adjusting-plate with respect to a front, a rear, or a side of the adjusting-plate is rectangular in shape; whereas, an orthogonal protection of a top or a bottom of the adjusting-plate is not rectangular in shape.

14. The adjusting-plate according to claim 12, wherein with respect to a transverse-width of the adjusting-plate, the adjustment-slot is located in a middle of the adjusting-plate.

15. The adjusting-plate according to claim 12, wherein the adjusting-plate further comprises a channel is a recess in the front surface, bisecting the front surface, wherein the channel runs the length of the adjusting-plate, and wherein the adjustment-slot is located within the channel.

16. The adjusting-plate according to claim 12, wherein with respect to the length of the adjusting-plate, the adjusting-plate comprises two holes that are located in a bottom one third of the length of the adjusting-plate, being located closer to a bottom edge of the adjusting-plate than to a top edge of the adjusting-plate, wherein the bottom edge is disposed opposite from the top edge, wherein the two holes are through holes that pass entirely through the thickness of the adjusting-plate from the front surface to the rear surface, wherein each of the two holes are configured to receive a screw.

17. The adjusting-plate according to claim 16, wherein each of the two holes are threaded.

18. The adjusting-plate according to claim 16, wherein the two holes are separated from each other by the adjustment-slot and/or a channel of the adjusting-plate.

19. A lighting-junction-box-assembly comprising:
a lighting-junction-box and at least one adjusting-plate that is removably attached to the lighting-junction-box;
wherein the lighting-junction-box comprises:
continuous sidewalls that surround a cavity, wherein the cavity is configured to house an electronic component that is configured to emit light, wherein the continuous side-walls are divided into an upper-portion and a lower-portion, wherein with respect to a vertical direction the upper-portion is disposed above the lower-portion, wherein the vertical direction runs from a bottom-circular-edge of the lower-portion to a top-edge of the upper-portion, wherein the upper-portion and the lower-portion are integral with each other;
the lower-portion is shaped as a cylindrical body with a predetermined diameter, wherein the bottom-circular-edge of the lower-portion is substantially circular; and
the upper-portion is comprised of six planar-faces and two curved-segments, wherein each of the six planar-faces are substantially flat and planar members, wherein each of the two curved-segments has a hole configured for receiving a distal portion of a carriage-bolt, wherein each of the two curved-segments have a same upper curvature that is the same as a lower curvature of the lower-portion, wherein lengths of the six planar-faces and lengths of the two curved-segments are all parallel with each other and all parallel with an overall length of the lighting-junction-box, wherein tops of the six planar-faces and tops of the two curved-segments all terminate at the top-edge, wherein the two curved-segments are disposed opposite from each other having an upper diameter that is the same as the predetermined diameter of the lower-portion;
wherein with respect to a top view of the lighting-junction-box the top-edge of the upper-portion is shaped substantially octagonal as follows: a first planar-faces is attached to a second planar-face, the second-planar-face is attached to a third planar-face, the third planar-face is attached to a first curved-segment, the first curved-segment is attached to a fourth planar-face, the fourth planar-face is attached to a fifth planar-face, the fifth planar-face is attached to a sixth planar-face, the sixth planar-face is attached to a second curved-segment, and the second curved-segment is attached to the first planar-face; wherein the first planar-face, the second planar-face, the third planar-face, the fourth planar-face, the fifth planar-face, and the sixth planar-face are selected from the six planar-faces; wherein the first curved-segment and the second curved-segment are selected from the two curved-segments;
wherein the at least one adjusting-plate comprises:
a front surface that is substantially flat and planar;
a rear surface that has a predetermined curve, wherein the rear surface is disposed opposite from the front surface and separated from the front surface by a thickness of the at least one adjusting-plate, wherein the predetermined curve has a plate curvature that is configured to complimentary match the same upper curvature of the two curved-segments and to complimentary match the lower curvature of the lower-portion, such that the rear surface is freely slidable against the same upper curvature of the two curved-segments and/or is freely slidable against the lower curvature of the lower-portion, with a majority of the rear surface being in physical contact with the same upper curvature of the two curved-segments and/or with the lower curvature of the lower-portion; and
an adjustment-slot that is an elongate slot that passes entirely through the at least one adjusting-plate from the front surface to the rear surface, wherein a length of the adjustment-slot is less than a length of the at least one adjusting-plate, wherein the length of the adjustment-slot is substantially parallel with the length of the at least one adjusting-plate, wherein the adjustment-slot has a width that is configured to removably receive at least a portion of the carriage bolt.

20. The lighting-junction-box-assembly according to claim 19, wherein the lightingjunction-box-assembly further comprises at least one guide-rail that is configured to be attached to the at least one adjusting-plate; wherein the at least one guide-rail is configured to removably attach to a hanger-bar.

* * * * *